(12) United States Patent
Chuang et al.

(10) Patent No.: US 9,509,112 B2
(45) Date of Patent: Nov. 29, 2016

(54) CW DUV LASER WITH IMPROVED STABILITY

(71) Applicant: KLA-Tencor Corporation, Milpitas, CA (US)

(72) Inventors: Yung-Ho Chuang, Cupertino, CA (US); Xiaoxu Lu, San Jose, CA (US); John Fielden, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/294,019

(22) Filed: Jun. 2, 2014

(65) Prior Publication Data

US 2014/0362880 A1 Dec. 11, 2014

Related U.S. Application Data

(60) Provisional application No. 61/833,716, filed on Jun. 11, 2013.

(51) Int. Cl.
*H01S 3/109* (2006.01)
*H01S 3/00* (2006.01)
(Continued)

(52) U.S. Cl.
CPC ............. *H01S 3/0092* (2013.01); *G02F 1/353* (2013.01); *G02F 1/3558* (2013.01); *G02F 2001/354* (2013.01)

(58) Field of Classification Search
CPC .... H01S 3/0092; H01S 3/108; G02F 1/3558; G02F 1/354; G02F 1/3532; G02F 1/3534; G02F 1/353; G02F 2001/354; G02F 2001/3542
See application file for complete search history.

(56) References Cited

U.S. PATENT DOCUMENTS

| 5,339,324 A | 8/1994 | Eguchi et al. |
| 5,367,531 A | 11/1994 | Eguchi et al. |

(Continued)

FOREIGN PATENT DOCUMENTS

| DE | 102005015497 A1 | 10/2006 |
| JP | 2004086193 A1 | 3/2004 |

(Continued)

OTHER PUBLICATIONS

Watanabe et al. "Continuous-wave sum-frequency generation near 194 nm in β-BaB2O4 crystals with an enhancement cavity," Jan. 1, 1992, Optics Letters, vol. 17, No. 1, pp. 46-48.*

(Continued)

*Primary Examiner* — Yuanda Zhang
*Assistant Examiner* — Michael Carter
(74) *Attorney, Agent, or Firm* — Bever, Hoffman & Harms, LLP

(57) ABSTRACT

A deep ultra-violet (DUV) continuous wave (CW) laser includes a fundamental CW laser configured to generate a fundamental frequency with a corresponding wavelength between about 1 μm and 1.1 μm, a third harmonic generator module including one or more periodically poled non-linear optical (NLO) crystals that generate a third harmonic and an optional second harmonic, and one of a fourth harmonic generator module and a fifth harmonic generator. The fourth harmonic generator module includes a cavity resonant at the fundamental frequency configured to combine the fundamental frequency with the third harmonic to generate a fourth harmonic. The fourth harmonic generator module includes either a cavity resonant at the fundamental frequency for combining the fundamental frequency with the third harmonic to generate a fifth harmonic, or a cavity resonant at the second harmonic frequency for combining the second harmonic and the third harmonic to generate the fifth harmonic.

22 Claims, 13 Drawing Sheets

(51) Int. Cl.
*G02F 1/355* (2006.01)
*G02F 1/35* (2006.01)

(56) References Cited

U.S. PATENT DOCUMENTS

| | | | |
|---|---|---|---|
| 5,418,810 | A | 5/1995 | Eguchi et al. |
| 5,563,702 | A | 10/1996 | Emery et al. |
| 5,625,633 | A | 4/1997 | Ichimura et al. |
| 5,936,761 | A | 8/1999 | Kubota et al. |
| 5,943,353 | A | 8/1999 | Kaneko |
| 6,018,413 | A | 1/2000 | Oka |
| 6,181,461 | B1 | 1/2001 | Wada et al. |
| 6,201,601 | B1 | 3/2001 | Vaez-Iravani et al. |
| 6,271,916 | B1 | 8/2001 | Marxer et al. |
| 6,285,691 | B1 | 9/2001 | Kaneda et al. |
| 6,327,281 | B1 | 12/2001 | Yin |
| 6,714,567 | B2 | 3/2004 | Masuda |
| 6,862,131 | B2 | 3/2005 | Masuda |
| 7,027,209 | B2 | 4/2006 | Zanger et al. |
| 7,352,457 | B2 | 4/2008 | Kvamme et al. |
| 7,463,657 | B2 * | 12/2008 | Spinelli ............... G02F 1/3532 372/21 |
| 7,525,649 | B1 | 4/2009 | Leong et al. |
| 7,528,943 | B2 | 5/2009 | Brown et al. |
| 7,773,643 | B2 | 8/2010 | Masuda |
| 7,920,607 | B2 | 4/2011 | Furutachi et al. |
| 8,711,460 | B2 | 4/2014 | Ueda et al. |
| 2002/0148942 | A1 * | 10/2002 | Payne et al. ............... 250/201.9 |
| 2006/0165136 | A1 * | 7/2006 | Johansson et al. ............. 372/21 |
| 2006/0176916 | A1 | 8/2006 | Zanger et al. |
| 2007/0002465 | A1 | 1/2007 | Chuang et al. |
| 2008/0225904 | A1 * | 9/2008 | Brown et al. ................ 372/22 |
| 2009/0180176 | A1 | 7/2009 | Armstrong et al. |
| 2011/0013653 | A1 | 1/2011 | Krausz et al. |
| 2011/0026548 | A1 * | 2/2011 | Tamaya et al. ................ 372/21 |
| 2011/0122896 | A1 | 5/2011 | Mao |
| 2011/0228263 | A1 | 9/2011 | Chuang et al. |

FOREIGN PATENT DOCUMENTS

| | | |
|---|---|---|
| JP | 2006-343786 A | 12/2006 |
| WO | 02/44807 A3 | 6/2002 |
| WO | 02/48785 A2 | 6/2002 |
| WO | 2004/066460 A1 | 8/2004 |
| WO | 2006/026540 A2 | 3/2006 |
| WO | 2010/037106 A2 | 4/2010 |
| WO | 2012128354 A1 | 9/2012 |

OTHER PUBLICATIONS

Gupta, "The Handbook of Photonics," 2007, CRC Press, second edition, pp. 6-27-6-29.*
KLA-Tencor Corporation, PCT International Search Report and Written Opinion dated Oct. 24, 2014 for PCT/US2014/041965 (corresponding U.S. Appl. No. 14/294,019), 16 pages.
Antonosyan et al. "Phase-reserved structures in superlattice of nonlinear materials," http://arxiv.org/abs/1109.2751v1 (2011), 6 pages.
Black, E.: LIGO Technical Note LIGO-T980045-00-D, "Notes on the Pound-Drever-Hall technique," Caltech and MIT (Apr. 16, 1998), 15 pages.
Drever et al. "Laser phase and frequency stabilization using an optical resonator," Appl. Phys. B31 (2) pp. 97-105 (1983).
Hansch, T. W. et al. "Laser frequency stabilization by polarization spectroscopy of a reflecting reference cavity," Opt. Commun., vol. 35, No. 3, Dec. 1980, pp. 441-444.
Huang et al. "Effect of electro-optic modulat on coupled quasi-phase-matched frequency conversion," Applied Optics, vol. 44, No. 23, pp. 4980-4984 (2005).
Jundt, Dieter H. "Temperature-dependent Sellmeier equation for the index of refraction, ne, in congruent lithium niobate," Optics Letters, vol. 22, No. 20, Oct. 15, 1997, pp. 1553-1555.
Liu et al. "Quasi-Cw Ultraviolet Generation in a Dual-periodic LiTaO3 Superlattice by Frequency Tripling," Japanese Journal of Applied Physics, vol. 40, pp. 6841-6844 (2001).
Meyn et al. "Tunable ultraviolet radiation by second-harmonic generation in periodically poled lithium tantalate," Opt. Lett., vol. 22, No. 16, Aug. 15, 1997, pp. 1214-1216.
Mizuuchi et al. "Continuous-wave ultraviolet generation at 354nm in a periodically poled MgO:LiNbO3 by frequency tripling of a diode end-pumped Nd:GdVO4 microlaser," Appl. Phys. Lett. vol. 85, No. 18, Nov. 2004, pp. 3959-3961.
Sakuma et al. "High-Power CW Deep-UV Coherent Light Sources Around 200 nm Based on External Resonant Sum-Frequency Mixing," IEEE Journal of Selected Topics in Quantum Electronics, vol. 10, No. 6, 2004, pp. 1244-1251.
Torabi-Goudarzi et al. "Efficient CW high-power frequency doubling in periodically poled KTP," Optics Communications, vol. 227, Issues 4-6, Nov. 15, 2003, pp. 389-403.

* cited by examiner

CW DUV LASER WITH IMPROVED STABILITY

RELATED APPLICATIONS

The present application claims priority to U.S. Provisional Patent Application 61/833,716, entitled "CW DUV Laser with Improved Stability", filed by Chuang et al. on Jun. 11, 2013, which is incorporated by reference herein.

RELATED ART

Semiconductor inspection and metrology require very stable, low-noise light sources to detect small defects and/or make very precise measurements of small dimensions. UV light sources, i.e. light sources with wavelengths 100-400 nm, are important because, in general, short wavelengths give better sensitivity to small defects or dimensions.

Low-noise, high-stability lasers are available for wavelengths in the visible and near infra-red. However there are very few deep UV CW lasers available with powers greater than 250 mW, and those lasers are expensive, noisy, have poor long-term stability, and may require frequent adjustments or service.

Currently available deep UV (DUV), i.e. a wavelength shorter than 300 nm, CW lasers operate by generating the fourth harmonic of an infra-red (IR) fundamental laser. Two frequency conversion stages are used: the first stage generates the second harmonic, and the second stage generates the fourth harmonic. Each frequency conversion stage uses a non-linear optical (NLO) crystal.

The frequency doubling process depends on the square of the electric field strength. If the power density inside the crystal is low, then the conversion process is very inefficient. An infra-red laser of a few Watts or a few tens of Watts of power, when focused into a NLO crystal, produces very little second harmonic because of the low power density. This is in contrast to a pulsed laser of a similar average power level, which can produce substantial amounts of second harmonic (in the best cases roughly 50% of the input can be converted to the second harmonic) because the peak power density is many times higher than the average power density.

DUV CW (continuous wave) lasers use resonant cavities to increase the power density in the NLO crystals to improve the conversion efficiency. Most of the light that passes through a NLO crystal without being converted to the second harmonic is recirculated in the resonant cavity so as to build up the power density. The second harmonic is allowed to pass out of the resonant cavity. Eventually the power density builds up to a level where the power leaving the resonant cavity as second harmonic plus the losses in the resonant cavity equals the input power. Therefore, to generate deep UV wavelengths, two of these cavities must be connected in series. The first resonant cavity generates the second harmonic (i.e. a visible wavelength, typically a green wavelength such as 532 nm) by recirculating the IR fundamental, and the second resonant cavity generates the fourth harmonic (i.e. a deep UV wavelength such as 266 nm) by recirculating the second harmonic.

FIG. 1 illustrates an exemplary deep-UV CW laser 100 including two resonant cavities. In laser 100, a first cavity for generating the second harmonic includes mirrors 110, 111, 112, and 113, and a NLO crystal 115. A second cavity for generating the fourth harmonic includes mirrors 130, 131, 132, and 133, and a NLO crystal 135. Notably, these cavities must be actively controlled. The control for the first cavity includes an oscillator 104 (generating a signal at frequency f1), a modulator 103, a photodiode 105, and a synchronous detector 106 (generating an actuator control signal 107 to control the position of mirror 111). The control for the second cavity includes an oscillator 124 (generating a signal at frequency f2), a modulator 123, a photodiode 125, and a synchronous detector 126 (generating an actuator control signal 127 to control the position of mirror 131).

Laser 100 includes a fundamental laser 101, which generates IR light at 1064 nm in wavelength. This IR light enters the first cavity through mirror 110 and, after reflecting from mirrors 111 and 112, enters NLO crystal 115. A portion of the IR light entering crystal 115 is converted to the second harmonic at a wavelength of 532 nm. The 532 nm light passes through mirror 113 and is directed to the second cavity. Most of the IR light passing through NLO crystal 115 emerges from the NLO crystal without being converted and reflects from mirror 113, which is coated so as to reflect 1064 nm light while transmitting 532 nm light. Light reflected from mirror 113 arrives back at input mirror 110. The coating on mirror 110 is designed to be highly reflective to the IR arriving at the angle of incidence of the ray from mirror 113, while being highly transmissive to the incoming IR radiation arriving from fundamental laser 101.

To build up a high power density in the first cavity, it is important that the IR radiation that has circulated around the first cavity arrive at mirror 110 in phase with the incoming radiation. This in-phase arrival can be achieved by using a servo control that mechanically moves mirror 111 (e.g. by means of a piezo-electric transducer or a voice coil) to maintain the correct cavity optical path length. A photodiode 105 monitors a small portion of the light circulating in the first cavity to provide a signal to the servo control. The input laser beam is modulated by modulator 103 at frequency f1 to provide a time-varying signal that is used by the servo control to determine whether the first cavity needs to be adjusted and, if so, in which direction. The servo control loop described above for the first cavity is commonly used and known as a Pound-Drever-Hall (PDH) control. Its theory is described by Dreyer et al., "Laser phase and frequency stabilization using an optical resonator", Appl. Phys. B 31, pp 97-105 (1983). Additional details can be found in, for example, U.S. Pat. No. 5,367,531, entitled "Laser light beam generating apparatus", issued on Nov. 22, 1994, as well as LIGO Technical note LIGO-T980045-00-D by Black (1998).

Another scheme commonly used in laser servo control loops is the Hansch-Couillaud (HC) technique. In this scheme, no modulation is needed for the beam before entering the cavity; however, it only works for cavities that are polarization sensitive. This scheme detects the polarization change of the total reflected or transmitted beam to determine if the cavity is on resonance or not. Further details regarding this scheme can be found in "Laser frequency stabilization by polarization spectroscopy of a reflecting reference cavity", by Hansch and Couillaud, Opt. Commun. 35(3), 441 (1980).

The second cavity operates in a substantially similar manner to the first cavity except that the input wavelength is 532 nm and the output wavelength 266 nm. The coatings and materials of the second cavity components are chosen appropriately for those wavelengths. In laser 100, a second modulator 123 modulates the light at frequency f2 prior to entering the second cavity. The light enters the second cavity through mirror 130 and, after reflecting from mirrors 131 and 132, enters NLO crystal 135. A portion of the light entering crystal 135 is converted to the fourth harmonic at a wavelength of 266 nm. The 266 nm light passes through mirror 133 and is directed to the output of laser 100. Most of the light passing through NLO crystal 135 emerges from the NLO crystal without being converted and reflects from mirror 133, which is coated so as to reflect 532 nm light while transmitting 266 nm light. Light reflected from mirror 133 arrives back at input mirror 130. The coating on mirror 130 is designed to be highly reflective to the light arriving at the angle of incidence of the ray from mirror 133, while being highly transmissive to the incoming light arriving from modulator 123. Photodiode 125 detects a small portion of the circulating light. The signal from 125 is used by synchronous detector 126 to generate a control signal 127 that controls the position of mirror 131 in order to maintain the correct optical path length of the cavity.

In some embodiments (not shown), modulator 123 and oscillator 124 are omitted and therefore both servo loops operate at the same modulation frequency. In yet other embodiments (not shown), both modulators 103 and 123 are omitted. In this case, fundamental laser 101 generates a modulated output by operating the laser such that two modes are generated. Those two modes can be chosen to have a wavelength separation and relative amplitudes such that an appropriately modulated output is generated by the beating of the two modes.

Note that one or both cavities may comprise two or three mirrors instead of four.

In some prior art devices, the DUV output wavelength may be separated from the recirculating visible light by a beam splitter (not shown) placed between NLO crystal 135 and mirror 133. In some prior art devices, periodically poled nonlinear optical (NLO) materials are used for frequency conversion to generate green and/or UV CW light with quasi-phase-matching. There are currently no periodically poled materials available that are capable of generating DUV light at power levels useful for semiconductor inspection.

As explained above, in prior art devices, two frequency doubling cavities may be used in series. In this case, the first cavity is resonant at the fundamental frequency corresponding to a wavelength in the IR region and the second cavity is resonant for the second harmonic frequency with a wavelength of half of that of the IR light. For the same amount of cavity optical path length change, the phase change of the second cavity is twice as much compared to the first cavity. As a result, the second cavity is more difficult to stabilize due to its higher sensitivity. Furthermore, noise from the first cavity typically couples into the second cavity and may significantly affect the stability, thereby jeopardizing the conversion efficiency of the second cavity. Notably, the feedback loop of the second cavity cannot distinguish the noise from its input light and from the cavity itself. Therefore, the second cavity continuously tries to compensate for the mismatch. As a result, this type of prior art CW DUV laser is typically very noisy and requires complicated servo loops for stability.

Another limitation of prior art devices is that the feedback loops of the cavities can only adjust the cavity lengths to compensate for cavity optical path length changes. Changes in cavity focus or astigmatism cannot be compensated for by adjusting the cavity length.

For example, a temperature gradient inside a non-linear crystal creates a non-uniform refractive index profile within that crystal. Any change in average refractive index of the crystal changes the average optical path length in the cavity and may be compensated by a physical cavity length change. However the spatial variations in refractive index can change the focal length of the optics in the cavity and/or can create astigmatism in the focus of the circulating laser beam. The change in focus could, in principle, be compensated for by a change in cavity length if the cavity incorporated a sensor that could detect the change in focus, but the cavity length change required would not be the same as the cavity length change required to maintain the optical path length to keep the cavity on resonance. Thus correcting for focus would cause the output power of the laser to decrease or become unstable. Since astigmatism is caused by different focus positions in different direction, no cavity length change can compensate for astigmatism. Focus and astigmatism changes are typically a more serious problem in the second cavity than the first because the DUV light can induce larger changes in the NLO crystal properties than are induced by the fundamental or second harmonic light.

Therefore there is a need for DUV CW lasers with power levels greater than about 250 mW, with low noise, good long-term stability, while overcoming some, or all, of the above disadvantages.

SUMMARY

In accordance with the improved laser systems and associated techniques described herein, deep ultra-violet (DUV) continuous wave (CW) laser systems with frequencies corresponding to the fourth or fifth harmonic of the fundamental frequency of an IR laser can be generated with only one resonant cavity or with two IR resonant cavities. The improved laser systems have less complex feedback loops and much better stability compared to prior art DUV CW lasers.

A DUV CW laser system includes a fundamental CW laser, a third harmonic generator, and a fourth harmonic generator. The fundamental CW laser is configured to generate a fundamental frequency with a corresponding wavelength between about 1 µm and 1.1 µm. The third harmonic generator module includes at least one periodically poled non-linear optical (NLO) crystal to generate a third harmonic. The fourth harmonic generator module includes a cavity resonant at the fundamental frequency. The fourth harmonic generator module is configured to combine the fundamental frequency with the third harmonic to generate a fourth harmonic.

Another DUV CW laser system includes a fundamental CW laser, a third harmonic generator, and a fifth harmonic generator. The fundamental CW laser is configured to generate a fundamental frequency with a corresponding wavelength between about 1 µm and 1.1 µm. The third harmonic generator module includes at least one periodically poled NLO crystal to generate a third harmonic. The fifth harmonic generator module includes a cavity resonant at the fundamental frequency for combining the fundamental frequency with the third harmonic to generate a fifth harmonic.

Yet another DUV CW laser system includes a fundamental CW laser, a third harmonic generator, and a fifth harmonic generator. The fundamental CW laser is configured to generate a fundamental frequency with a corresponding wavelength between about 1 µm and 1.1 µm. The third harmonic generator module includes at least one periodically poled NLO crystal to generate a second harmonic and a third harmonic. The fifth harmonic generator module includes a cavity resonant at the second harmonic frequency for combining the second harmonic and the third harmonic to generate a fifth harmonic.

Various embodiments may have the following features. The third harmonic generator module may not use a resonant cavity. The third harmonic generator module may further include a cavity that is resonant at the fundamental frequency. The at least one periodically poled NLO crystal may generate the second harmonic or the third harmonic. The at least one periodically poled NLO crystal may include a dual-period poled crystal for direct generation of the third harmonic. The third harmonic generator module may include two periodically poled NLO crystals. The at least one periodically poled NLO crystal may be controlled in temperature to maximize third harmonic generation efficiency. The fundamental frequency may be focused to an elliptical beam with a short axis substantially parallel to a poling depth of the at least one periodically poled NLO crystal. The third harmonic generator module may use a periodically poled NLO crystal with a domain period longer than 2 µm to achieve third-order quasi-phase matching for sum frequency generation of the third harmonic. Electrooptic modulation may be used to enhance third harmonic conversion efficiency. The fourth harmonic generator module may not recirculate the third harmonic in a cavity. The fifth harmonic generator module may not recirculate the third harmonic in the cavity. The fifth harmonic generator module may not recirculate the third harmonic in the cavity.

A method of generating a fourth harmonic from a fundamental frequency corresponding to a wavelength of approximately 1 to 1.1 µm is described. A second harmonic frequency is created by converting a portion of the fundamental frequency using a periodically poled nonlinear optical (NLO) crystal. Another portion of the fundamental frequency is combined with the second harmonic to generate a third harmonic. The fourth harmonic is created by combining another portion of the fundamental frequency with the third harmonic in a cavity resonant at the fundamental frequency. In this method, no cavity resonating at the second harmonic is used, compared with prior art systems using a fundamental cavity and a second harmonic cavity in series. Because the second harmonic has a wavelength that is half that of the fundamental frequency, a cavity resonant at the second harmonic frequency is less stable and more prone to drift and instability than a cavity resonant at the fundamental frequency.

A method of generating a fifth harmonic from a fundamental frequency corresponding to a wavelength of approximately 1 to 1.1 µm is described. A portion of the fundamental frequency is converted to a second harmonic using a periodically poled NLO crystal. Another portion of the fundamental frequency is combined with the second harmonic to generate a third harmonic. A fourth harmonic is generated by combining another portion of the fundamental frequency with the third harmonic in a cavity resonant at the fundamental frequency. A fifth harmonic is generated by combining the fourth harmonic and a recirculating fundamental frequency inside the cavity.

A method of generating a fifth harmonic from a fundamental frequency corresponding to a wavelength of approximately 1 to 1.1 µm is described. A portion of the fundamental frequency is converted to a second harmonic using a periodically poled NLO crystal. Another portion of the fundamental frequency is combined with the second harmonic to generate a third harmonic. A fifth harmonic is generated by combining the second harmonic with the third harmonic in a cavity resonant at the second harmonic frequency.

In one embodiment, the NLO crystal that generates the second harmonic is not placed in any resonant cavity. In this embodiment, only one resonant cavity is used, i.e. the cavity that generates the fourth and fifth harmonics. In another embodiment, the NLO crystals that generate the second and third harmonics are contained in a cavity that is resonant at the fundamental frequency. In this embodiment, two resonant cavities are used, both cavities resonating only at the fundamental frequency.

In one embodiment the NLO crystals that generate the second and third harmonic frequencies are not placed in any resonant cavity. In this embodiment, only one cavity resonating at the second harmonic frequency is used: the cavity that generates the fifth harmonics. In another embodiment, the NLO crystals that generate the second and third harmonics are contained in a cavity that is resonant at the fundamental frequency. In this embodiment, two resonant cavities are used: one resonating at fundamental frequency followed by another one resonating at the second harmonic frequency, as in the prior art devices. Notably, this configuration generates a higher frequency compared to the prior art devices.

Note that if the fundamental laser generates a wavelength of 1064 nm, then the fourth harmonic frequency will correspond to a wavelength of 266 nm and the fifth harmonic frequency will correspond to a wavelength of approximately 213 nm. The lasing medium of the fundamental laser may include an ytterbium-doped fiber, a neodymium-doped yttrium aluminum garnet crystal, a neodymium-doped yttrium orthovanadate crystal, or neodymium-doped gadolinium vanadate.

Direct third harmonic generation is difficult due to the small $\chi^{(3)}$ nonlinearity of optical media and phase-matching constraints. Therefore, in the improved lasers disclosed herein, third harmonic generation is realized as a cascaded process, beginning with frequency doubling of the input beam and subsequent sum frequency generation, with both processes based on nonlinear crystal materials with a $\chi^{(2)}$ nonlinearity.

In one embodiment of a third harmonic generator module, periodically poled crystals are used for quasi-phase matching (QPM). Compared with the perfectly phase-matched case with bulk NLO crystals, QPM makes it possible to use the same polarization direction for all interacting waves, and this often corresponds to using a stronger element of the nonlinear tensor. The conversion efficiency can be significantly higher than for critical phase matching. The propagation direction can be along the crystal optical axis, so that spatial walk-off is avoided, and the acceptance angle is large. Furthermore, periodically poled crystals may have reduced photorefraction because effects in differently oriented domains tend to cancel each other.

The poling period determines the wavelengths for which certain nonlinear processes can be quasi-phase-matched. The calculation of the right poling period is based on refractive index values obtained from, for example, approximate Sellmeier equations.

With a high-power single-frequency IR laser source generating the fundamental frequency and using high quality periodically poled crystals, a single-pass scheme can generate sufficient third harmonic frequency for the subsequent sum-frequency generation stage.

DETAILED DESCRIPTION OF THE DRAWINGS

Figure 1:
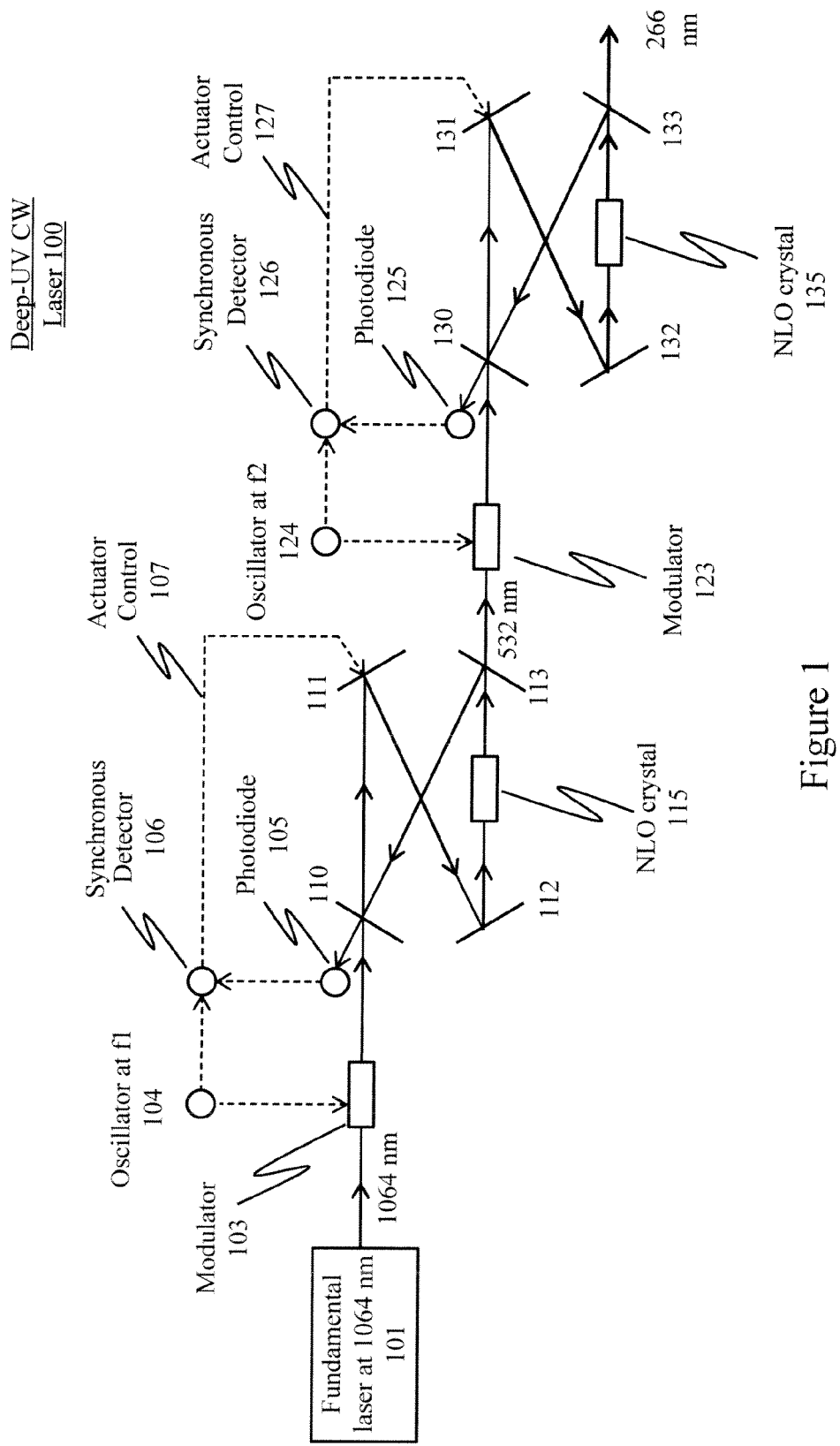
FIG. 1 illustrates an exemplary prior art deep-UV CW laser including two resonant cavities.
Figure 2A:
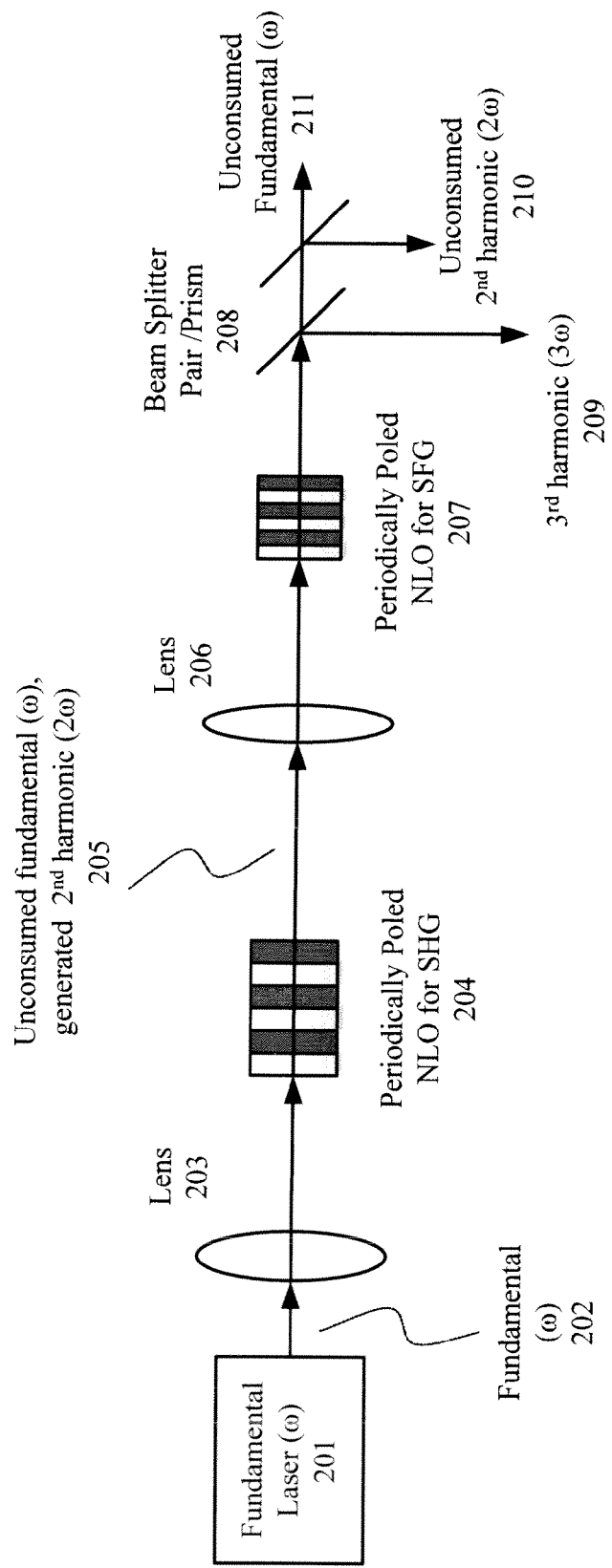
FIG. 2A illustrates an exemplary third harmonic generator module in a single-pass configuration.

FIG. 2A illustrates an exemplary third harmonic generator module 200 in a single-pumping-pass configuration. In this embodiment, a fundamental laser 201 operating at a frequency ω generates fundamental 202. A lens 203 is positioned to focus fundamental 202 to a first periodically poled NLO crystal 204 for second harmonic generation (SHG). An achromatic lens 206 is positioned to focus the unconsumed fundamental (ω) and the generated second harmonic (2ω) 205 from NLO crystal 204 on a second periodically poled NLO crystal 207 for sum frequency generation (SFG). Lens 206 may comprise a doublet in some embodiments. Note that the surfaces of NLO crystals 204, 207 and/or lenses 203, 206 may be coated appropriately for high transmission at one or more of the frequencies. A beam splitter pair 208 (or a prism) can be used to separate a generated third harmonic (3ω) 209, an unconsumed second harmonic (2ω) 210, and an unconsumed fundamental (ω) 211.

In some embodiments, one or more of NLO crystals 204, 207 may comprise lithium niobate ($LiNbO_3$), stoichiometric lithium tantalate (SLT), lithium tantalate ($LiTaO_3$), potassium titanyl phosphate (KTP), potassium titanyl arsenate (KTA), and/or doped materials, such as magnesium oxide doped lithium niobate ($MgO:LiNbO_3$) or magnesium oxide doped stoichiometric lithium tantalate (MgO:SLT). In some embodiments of the improved laser systems described herein, crystals longer than 10 mm may be used to achieve a conversion efficiency higher than $0.012\%/W^2$.

In one embodiment, the temperature of NLO crystals 204, 207 is controlled to maximize the phase-matching efficiency. In another embodiment, lenses 203, 206 may focus their respective beams to an elliptical shape with the shorter axis along the depth direction of the periodically poled NLO crystal because the poling period may be more uniform with fewer defects near the surface than deep inside the crystal, especially when the required poling period is short. For example, instead of focusing the fundamental and second harmonics to beam diameters of about 200 μm, they might be focused to an elliptical shape with a major axis of about 400 μm oriented substantially parallel to the top surface of the crystal, and a minor axis of about 100 μm substantially perpendicular to the top surface of the crystal. Since the most uniform region of the poled crystal may be within about 100 μm of the surface, keeping the minor axis of the ellipse to about 100 μm or less may improve the conversion efficiency and crystal lifetime. In preferred embodiments, one of the harmonics will be focused to a slightly larger spot than the other in order that small relative displacements of the two harmonics will have minimal effect on the conversion efficiency. Since more fundamental power is available than second harmonic power, it is preferred to focus the second harmonic more tightly than the fundamental. For example the fundamental may be focused to an ellipse of about 400 μm by about 100 μm, while the second harmonic is focused to an ellipse of about 380 μm by about 80 μm.

The first-order quasi-phase matching (QPM) condition for efficient generation of UV sum frequency typically has a domain period less than about 2 μm. Some embodiments use third-order quasi-phase matching of the sum-frequency generation stage with a domain period longer than 2 μm. Although third-order quasi-phase matching results in less efficient conversion for a given crystal length, this longer domain period may produce sufficient efficiency for the third harmonic generator module, while simplifying the fabrication of the periodically poled NLO crystal.

Figure 2B:
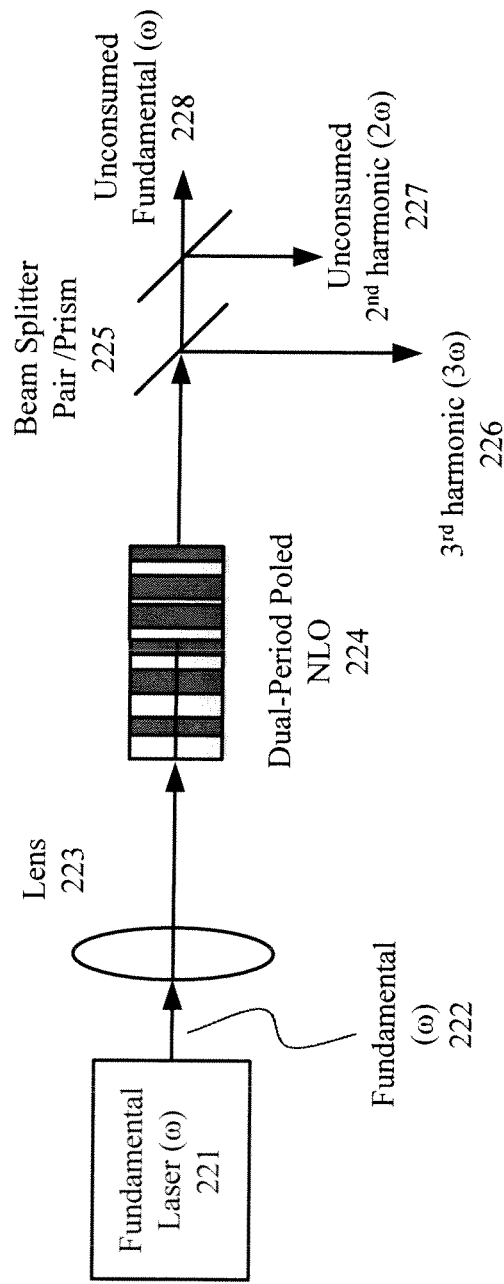
FIG. 2B illustrates another exemplary third harmonic generator module with a single crystal for efficient third harmonic generation.

FIG. 2B illustrates another third harmonic generator module 220 with a single crystal for an efficient third harmonic generation. In this embodiment, a fundamental laser 221 operating at a frequency ω generates fundamental 222. A lens 223 is positioned to focus fundamental 222 to a dual-periodic poled NLO crystal 224 for generating second and third harmonics. Such a crystal allows coupling of two separate optical parametric processes, i.e. frequency doubling and sum frequency generation, through a cascaded quasi-phase-matched interaction, thereby allowing generating the third harmonic directly from a super-lattice crystal sample. A theoretical description of dual-period and super-lattice poled NLO materials can be found in Antonosyan et al. in "Phase-reversed structures in superlattice of nonlinear materials", http://arxiv.org/abs/1109.2751v1 (2011). An example of a dual-periodic lithium tantalate structure can be found in Liu et al., "Quasi-Cw Ultraviolet Generation in a Dual-periodic $LiTaO_3$ Superlattice by Frequency Tripling", Japanese Journal of Applied Physics, vol. 40, pp 6841-6844 (2001). Both of these papers are incorporated by reference herein. Dual-period poled NLO 224 may have a higher efficiency and a simpler light path for third harmonic generation than one using two bulk crystals or periodically poled crystals in series. The surfaces of dual-period poled NLO crystal 224 and/or lens 223 may be coated appropriately for high transmission at one or more of the frequencies. Beam splitter pair 225 (or a prism) can be used to separate a generated third harmonic (3ω) 226, an unconsumed second harmonic (2ω) 227, and an unconsumed fundamental (ω) 228.

In some embodiments, the electro-optic effect may be employed to manipulate the phase-matching condition and energy distribution of the coupled waves to enhance the nonlinear conversion efficiency. This can be achieved by applying a DC electric field along the length of the NLO crystal. A description of how this can enhance nonlinear conversion can be found in Huang et al., "Effect of electro-optic modulation on coupled quasi-phase-matched frequency conversion", Applied Optics, vol. 23, pp 4980-4984 (2005), which is incorporated by reference herein.

Figure 2C:
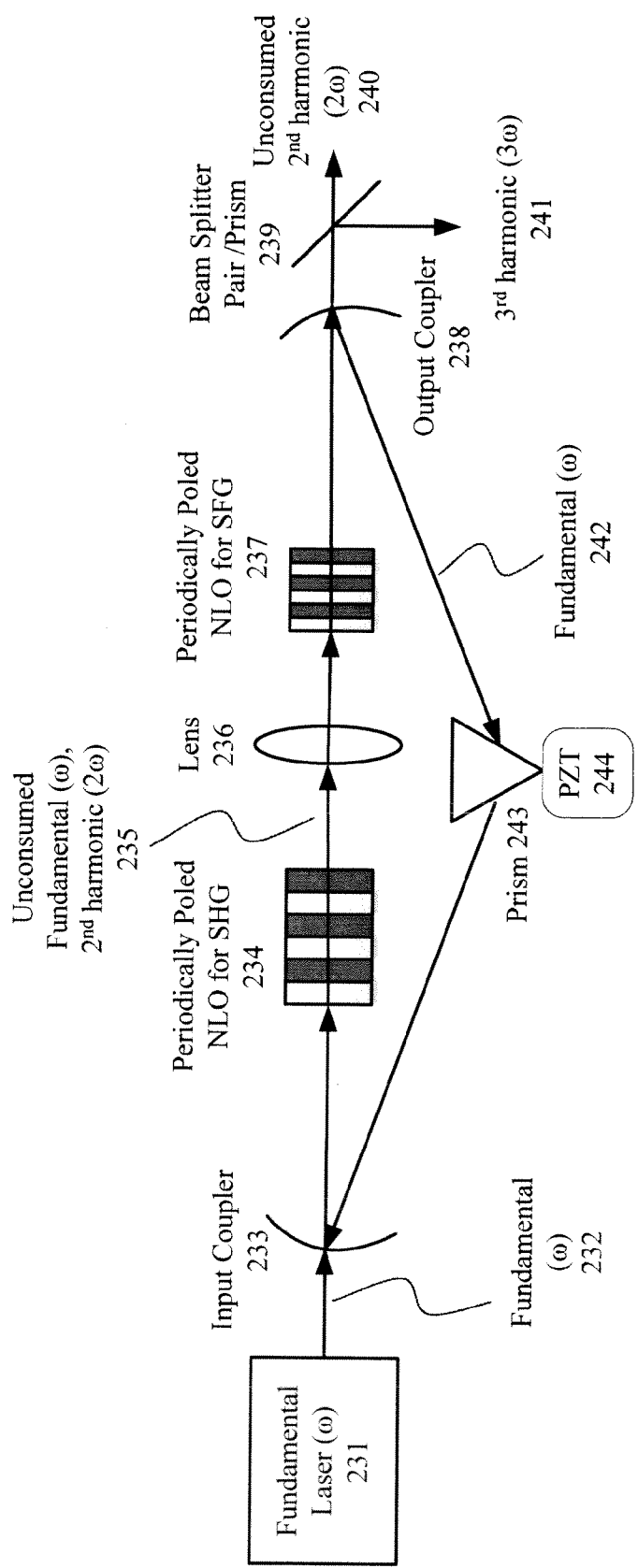
FIG. 2C illustrates yet another exemplary third harmonic generator module that includes a resonant cavity to enhance the fundamental power for the third harmonic generation.

FIG. 2C illustrates yet another exemplary third harmonic generator module 230 that includes a resonant cavity to enhance the fundamental power for the third harmonic generation. In this embodiment, a fundamental laser 231 operating at a frequency ω generates the fundamental 232. An input coupler 233, such as a curved mirror, is positioned to focuses the fundamental 232 to a first periodically-poled NLO crystal 234 for the second harmonic generation. An achromatic lens 236 (or a doublet) is positioned to focus a generated second harmonic (2ω) and an unconsumed fundamental (ω) 235 from first periodically poled NLO crystal 234 to a second periodically poled NLO crystal 237 for sum frequency generation. The surfaces of NLO crystals 234, 237 and/or lens 236 may be coated appropriately for high transmission at one or more of the frequencies. The second and third harmonic frequencies are coupled out of the cavity through an output coupler 238, which is highly reflective for the fundamental (ω) and highly transmissive for the second harmonic (2ω) and the third harmonic (3ω). In one embodiment, output coupler 238 is implemented by a mirror. A beam splitter 239 (or prism) can separate the unconsumed second harmonic (2ω) 240 and the third harmonic (3ω) 241. After reflection from output coupler 238, the residual fundamental (ω) 242 is collimated as it passes through a prism 243, returns to input coupler 233, and circulates inside the cavity. In one embodiment, prism 243 is attached to a piezo-electric transducer (PZT) 244 for cavity length feedback control.

In some embodiments, the second (2ω) and third harmonic (3ω) light could also be separated from the resonating fundamental (ω) by adding a beam splitter before output coupler 238 to avoid complex coating and possible damage on output coupler 238. Note that although FIG. 2C shows a triangular cavity including input coupler 233, output coupler 238, and prism 243, any shaped cavity could be used, including a bow-tie cavity or a rectangular cavity.

In one embodiment, prism 243 may be replaced by one or more mirrors. In another embodiment, the prism 243 has its incoming and exiting surfaces at, or close to, Brewster's angle, thereby making anti-reflection coatings unnecessary. Note that although prism 243 may be moved back and forth for cavity length control, the path direction outside prism 243 does not change. In yet another embodiment, a dual-period poled NLO crystal may be used in the cavity instead of two periodically poled NLO crystals, thereby yielding a higher efficiency and a simpler light path, as explained above in reference to FIG. 2B.

Figure 3:
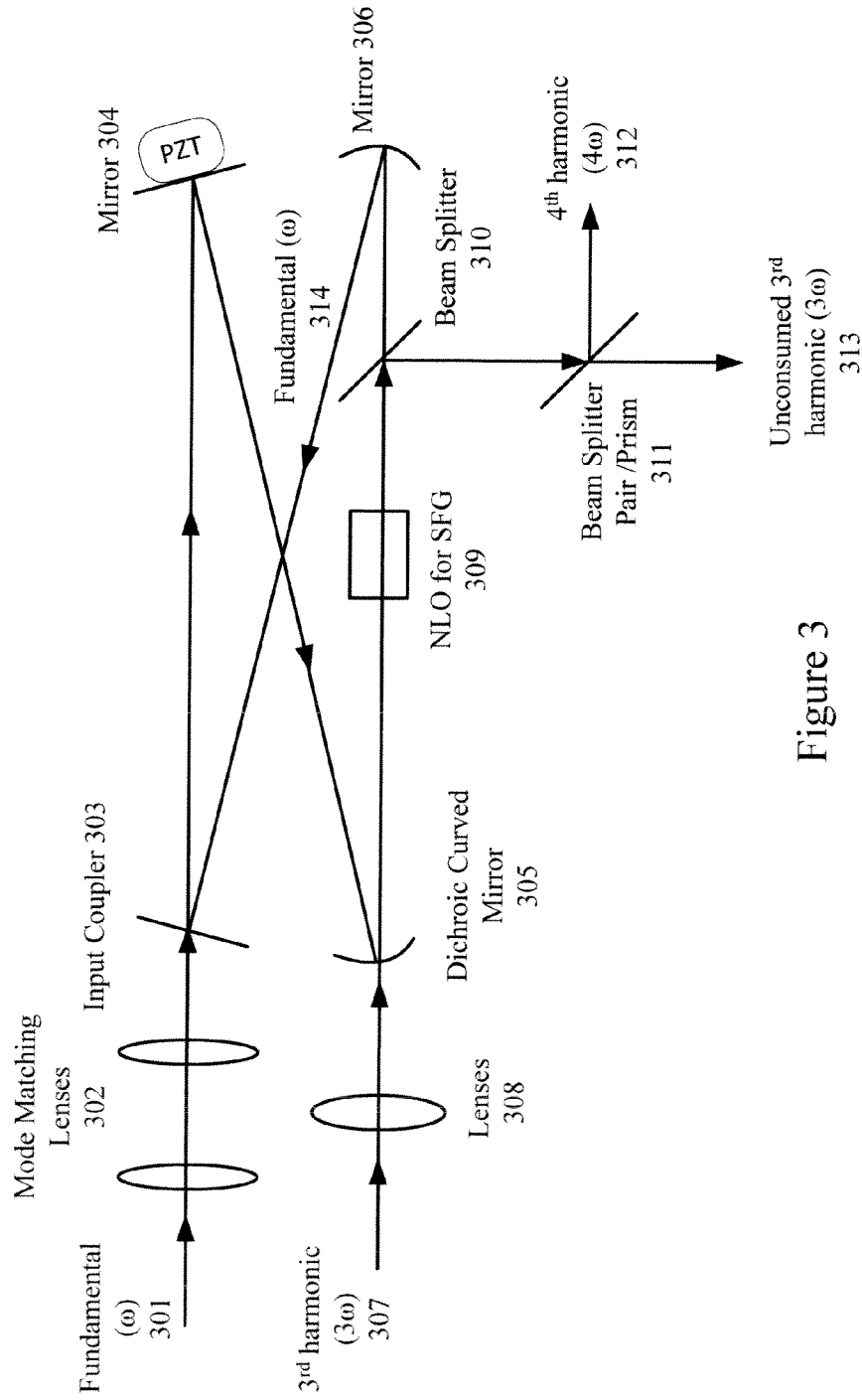
FIG. 3 illustrates an exemplary fourth harmonic generator module including a bow-tie cavity.

FIG. 3 illustrates a fourth harmonic generator module 300 including a bow-tie cavity. In this embodiment, the fundamental (ω) 301 passes through one, or more, mode matching lenses 302 before entering the bow-tie cavity in order to focus and couple the fundamental 301 into the bow-tie cavity. The bow-tie cavity includes an input coupler 303, mirrors 304, 305, 306, and a NLO crystal 309. In one embodiment, input coupler 303 is implemented by a mirror. In module 300, the third harmonic (3ω) enters the bow-tie cavity through mirror 305, e.g. a dichroic curved mirror, and overlaps with the fundamental frequency (ω) inside NLO crystal 309 for sum frequency generation. Mirror 305 is coated appropriately to allow the third harmonic to pass through efficiently while reflecting the fundamental with high efficiency.

In a preferred embodiment, NLO crystal 309 is a single bulk crystal comprising a material such as hydrogen-annealed cesium lithium borate (CLBO), cesium triborate (CBO), lithium triborate (LBO), lithium tetraborate (LB4) or beta barium borate (BBO). The advantage of a single bulk crystal for NLO crystal 309 is that a very short poling period would be needed for generating the short-wavelength fourth harmonic in a periodically poled crystal. Such short poling periods can be difficult or expensive to fabricate with the required quality. Both surfaces of NLO crystal 309 may be Brewster-cut for the fundamental (ω) with an appropriate coating for high transmission of the third (3ω) harmonic and the fourth harmonic (4ω).

A lens, or lenses, 308 focuses the third harmonic (3ω) near the center of NLO crystal 309. A beam splitter 310 (or prism or dichroic mirror) may reflect the fourth harmonic (4ω) 312 and an unconsumed third harmonic (3ω) 313 out of the cavity. The fourth harmonic 312 and the third harmonic 313 are further separated with beam splitter 311 (or prism). In this embodiment, the unconsumed fundamental (ω) 314 passes through beam splitter 310 and circulates inside the cavity to build up intensity. If the fundamental (ω) 314 is intense enough, then the conversion efficiency from the third harmonic light (3ω) to the fourth harmonic (4ω) is very high. In this embodiment, the fourth harmonic frequency is generated using only cavities resonating at the fundamental frequency.

In some embodiments, instead of having a bow-tie cavity, other shapes of cavity such as a delta shape or a standing-wave cavity are used. If a standing-wave cavity is used, the fourth harmonic is generated in the same direction as the injected third harmonic light.

Using the second, third, and fourth harmonic frequency generated as described above, it is possible to generate a shorter wavelength such as that corresponding to the fifth harmonic of the fundamental. Shorter wavelengths can further improve the resolution for various inspection applications.

Figure 4:
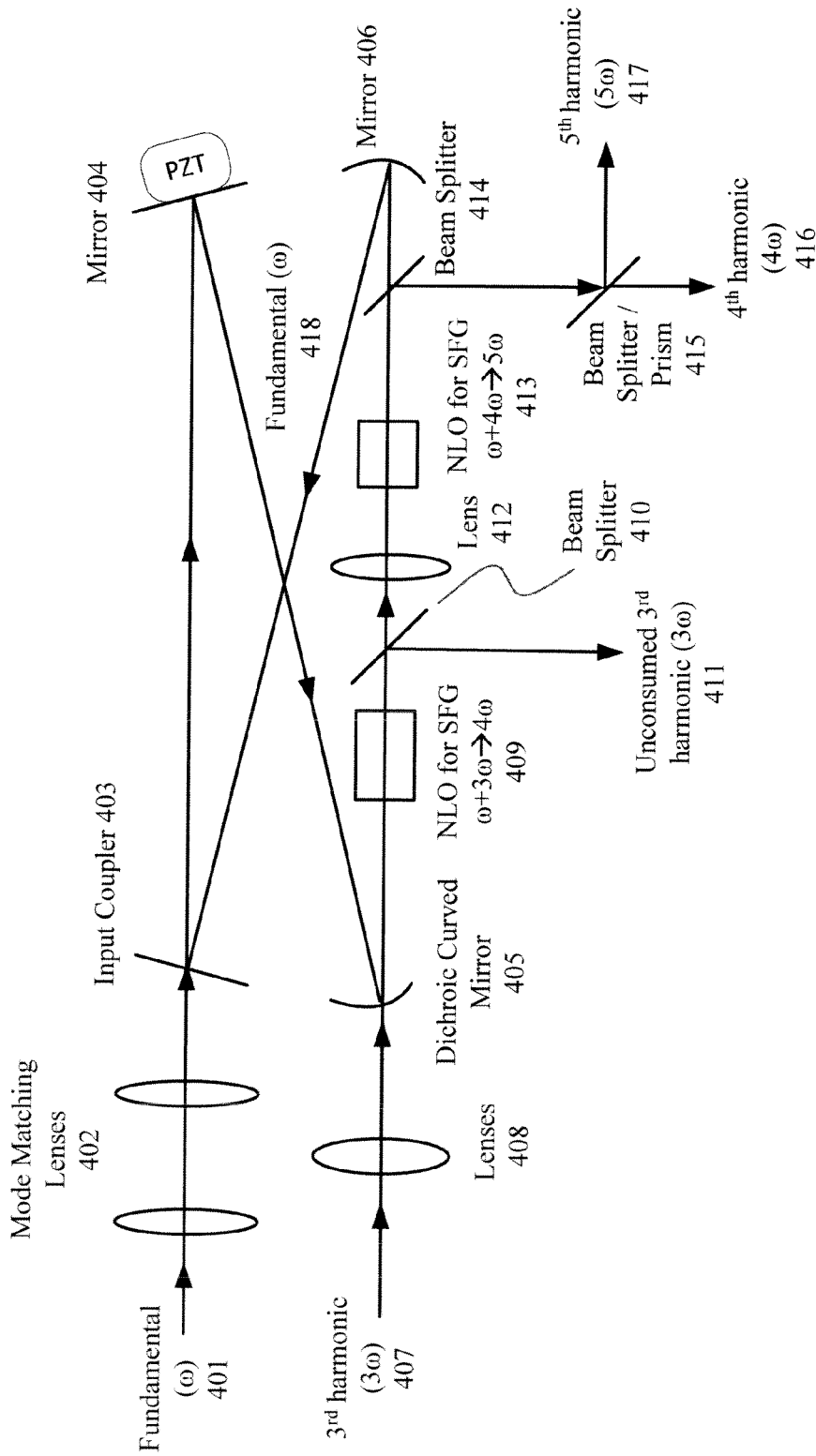
FIG. 4 illustrates an exemplary fifth harmonic generator module, which is configured to combine the fourth harmonic from a fourth harmonic generator module and an unconsumed portion of the fundamental in a bow-tie cavity to generate the fifth harmonic.

FIG. 4 illustrates an exemplary fifth harmonic generator module 400, which is configured to combine the fourth harmonic from a fourth harmonic generator module (see e.g. FIG. 3) and an unconsumed portion of the fundamental in a bow-tie cavity to generate the fifth harmonic. Mode-matching lens 402 (or lenses) focuses and couples the fundamental 401 into the cavity. The cavity including mirrors 403 (input coupler), 404, 405, 406 is resonant at the fundamental frequency. The third harmonic (3ω) 407 passes through mirror 405 (e.g. a dichroic curved mirror) and overlaps with the fundamental frequency (ω) in a first NLO crystal 409. A lens 408 focuses the third harmonic (3ω) near the center of NLO crystal 409. NLO crystal 409 sums the fundamental frequency (ω) and the third harmonic (3ω) to create the fourth harmonic (4ω). A beam splitter 410 reflects any unconsumed third harmonic (3ω) 411 while efficiently transmitting the fourth harmonic (4ω) and an unconsumed fundamental (ω). Achromatic lens 412 (or doublet) focuses the unconsumed fundamental (ω) and fourth harmonic (4ω) near the center of a second NLO crystal 413 to generate the fifth harmonic (5ω) by frequency summation. NLO crystal 409 may include CLBO, CBO, LBO, LB4, BBO, etc., whereas NLO crystal 413 may include CLBO, LB4 or BBO. Beam splitter 414 (or dichroic mirror or prism) is used to pass the fundamental frequency (ω) 418 and divert a generated fifth harmonic (5ω) 417 and any unconsumed fourth harmonic (4ω) 416 out of the cavity. A dichroic beam splitter 415 (or prism) further separates fourth harmonic 416 and fifth harmonic 417. In some embodiments, the fundamental, the fourth harmonic, and the fifth harmonic may be separated from each other with a single beam splitter (or prism). The unconsumed fundamental light (ω) 418 that passes through beam splitter 414 circulates inside the bow-tie cavity. In this embodiment, the fifth harmonic frequency is generated only using a cavity resonating at the fundamental frequency.

Figure 5:
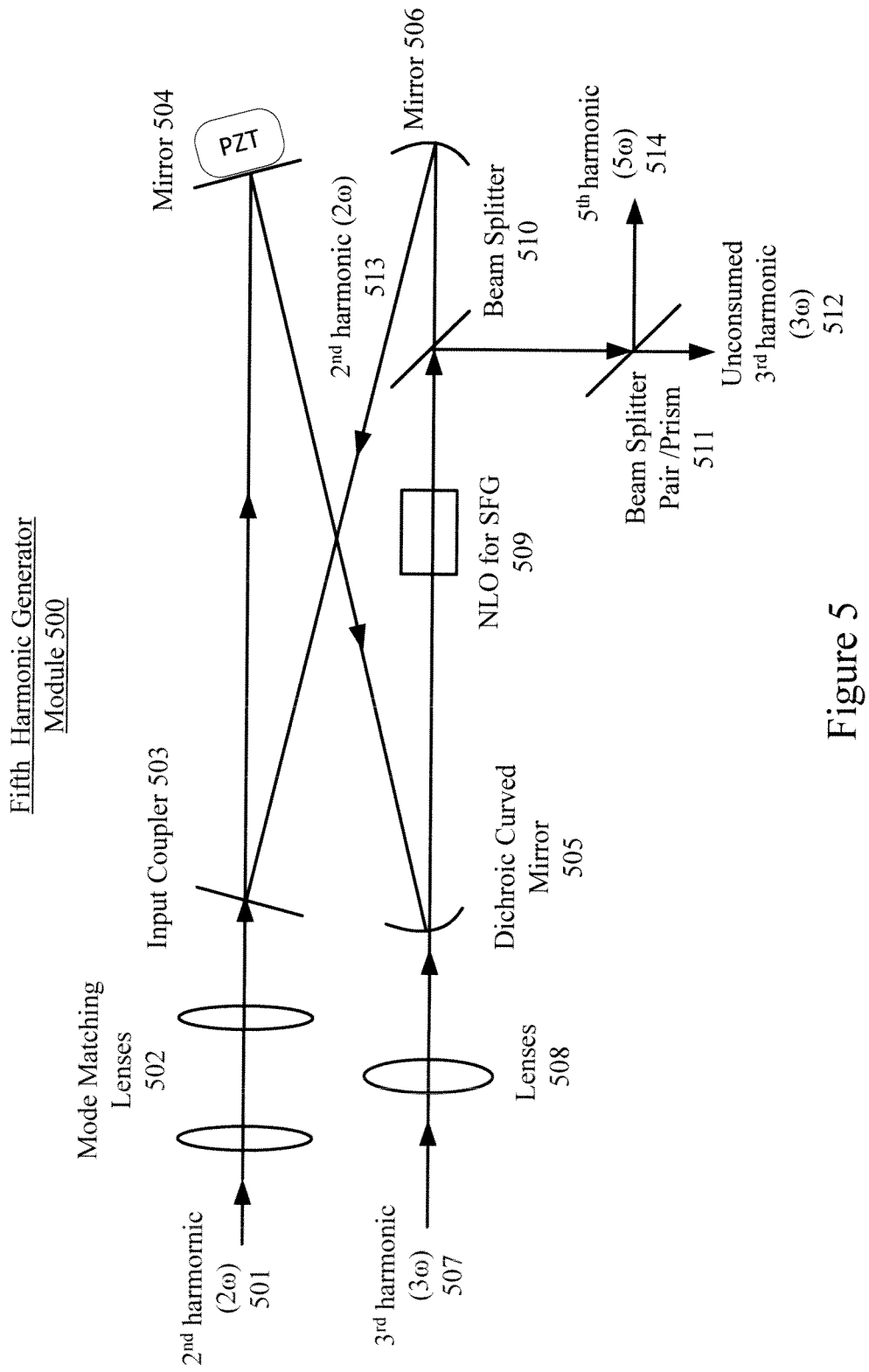
FIG. 5 illustrates another exemplary fifth harmonic generator module, which is configured to perform sum frequency generation in combining a third harmonic from a third harmonic generator module and an unconsumed portion of the second harmonic (and/or a second harmonic) to generate a fifth harmonic.

FIG. 5 illustrates another exemplary fifth harmonic generator module 500. In this embodiment, a NLO crystal 509 can perform sum frequency generation in combining a third harmonic (3ω) 507 from a third harmonic generator module (e.g. see FIG. 2B) and an unconsumed portion of the second harmonic (2ω) 513 (and/or second harmonic 501) to generate a fifth harmonic 513. To enhance the conversion efficiency, a second harmonic 501 is coupled into a resonant cavity comprising mirrors 503 (input coupler), 504, 505, 506 and a NLO crystal 509. The third harmonic (3ω) 507 enters the cavity through mirror 505 (e.g. a dichroic curved mirror) and overlaps with the second harmonic (2ω) 513 inside the NLO crystal 509. Mirror 505 is coated so as to efficiently pass the third harmonic 507 while efficiently reflecting the second harmonic 501, 513. Thus, this configuration is substantially similar to the fourth harmonic generator module (e.g. shown in FIG. 3), except that the cavity is resonant for the second harmonic (2ω) instead of the fundamental frequency (ω). In one embodiment, NLO crystal 509 comprises BBO because BBO can phase match for frequency summation of the second and the third harmonics. Both surfaces of NLO crystal 509 may be Brewster-cut for the second harmonic (2ω) and may be coated appropriately for high transmission of the third harmonic (3ω) and the fifth harmonic (5ω). Mode matching lenses 502 (or lenses) focus and couple second harmonic 501 into the cavity. A lens (or lenses) 508 focuses the third harmonic (3ω) 507 near the center of NLO crystal 509. A beam splitter 510 (or dichroic mirror or prism) reflect fifth harmonic (5ω) 514 and the unconsumed third harmonic (3ω) 513 out of the cavity. These two different harmonics 512 and 514 may be further separated with another beam splitter or prism 511. In some embodiments, the second, third, and fifth harmonics may be separated from each other by a single prism or beam splitter.

Note that when fifth harmonic generator module 500 is combined with third harmonic generator module such as 200 or 260 (neither of which uses a cavity), then the fifth harmonic is generated using only one cavity compared with at least two cavities in prior art devices. When fifth harmonic generator module 500 is combined with third harmonic generator module 230 (which uses a single cavity), then the fifth harmonic is generated with one cavity resonating at the fundamental frequency and a second cavity resonating at the second harmonic frequency. Prior art CW lasers using two resonant cavities generate only the fourth harmonic. Therefore, the embodiment including two cavities resonating respectively at the fundamental and at the second harmonic has an advantage of generating a shorter wavelength for the same number of cavities.

As in prior art CW lasers, the cavities can be stabilized with standard PDH (Pound-Drever-Hall) or HC (Hansch-Couillaud) locking techniques. The cavity length is adjusted to maintain resonance by adjusting the position of a mirror (such as mirror 304 in FIG. 3, mirror 404 in FIG. 4, or mirror 504 in FIG. 5) or prism (such as prism 225 in FIG. 2B) through a control signal (not shown). A PZT, voice coil or other mechanism may be used to adjust the position of the moveable component.

One skilled in the appropriate arts would understand that other conversion efficiency improvement methods for the third harmonic generation and subsequent sum-frequency generation stages would be within the scope of this invention.

Embodiments of the improved laser described herein that generate the fourth harmonic of a fundamental IR laser do not need a cavity resonating at the second harmonic frequency, which is less stable and more prone to drift than a cavity resonant at the fundamental frequency. In one embodiment, only one cavity resonating at the fundamental frequency is used to generate the fourth harmonic of a fundamental IR laser. In another embodiment, two resonant cavities are used to generate the fourth harmonic of a fundamental IR laser, but both cavities resonate only at the fundamental frequency.

Embodiments of the improved laser described herein that generate the fifth harmonic of a fundamental IR laser generate a shorter wavelength than prior art devices using two cavities. A first embodiment that generates the fifth harmonic of a fundamental IR laser uses only one cavity that resonates at the fundamental frequency. A second embodiment that generates the fifth harmonic of a fundamental IR laser uses two cavities both resonating at the fundamental frequency. A third embodiment that generates the fifth harmonic of a fundamental IR laser uses only one cavity resonating at the second harmonic frequency. A fourth embodiment that generates the fifth harmonic of a fundamental IR laser can generate higher power at the fifth harmonic by using a resonant cavity at the fundamental frequency before the resonant cavity at the second harmonic frequency.

Compared with prior art devices, the improved CW DUV laser systems will have less complex feedback loops with much better stability and/or generate a higher frequency corresponding to a shorter wavelength.

FIGS. 6-11 illustrate exemplary wafer inspection, reticle or photomask inspection and metrology systems that can include the improved DUV CW lasers described herein. When used in an inspection or metrology system, these lasers may advantageously be combined with the coherence and speckle reducing apparatus and methods disclosed in co-pending published PCT application WO 2010/037106, entitled "ILLUMINATION SUBSYSTEMS OF A METROLOGY SYSTEM, METROLOGY SYSTEMS, AND METHODS FOR ILLUMINATING A SPECIMEN FOR METROLOGY MEASUREMENTS", filed Sep. 29, 2009, and co-pending U.S. patent application Ser. No. 13/073,986, entitled "ILLUMINATING A SPECIMEN FOR METROLOGY OR INSPECTION", filed Sep. 22, 2011, both of which are incorporated by reference herein.

Figure 6:
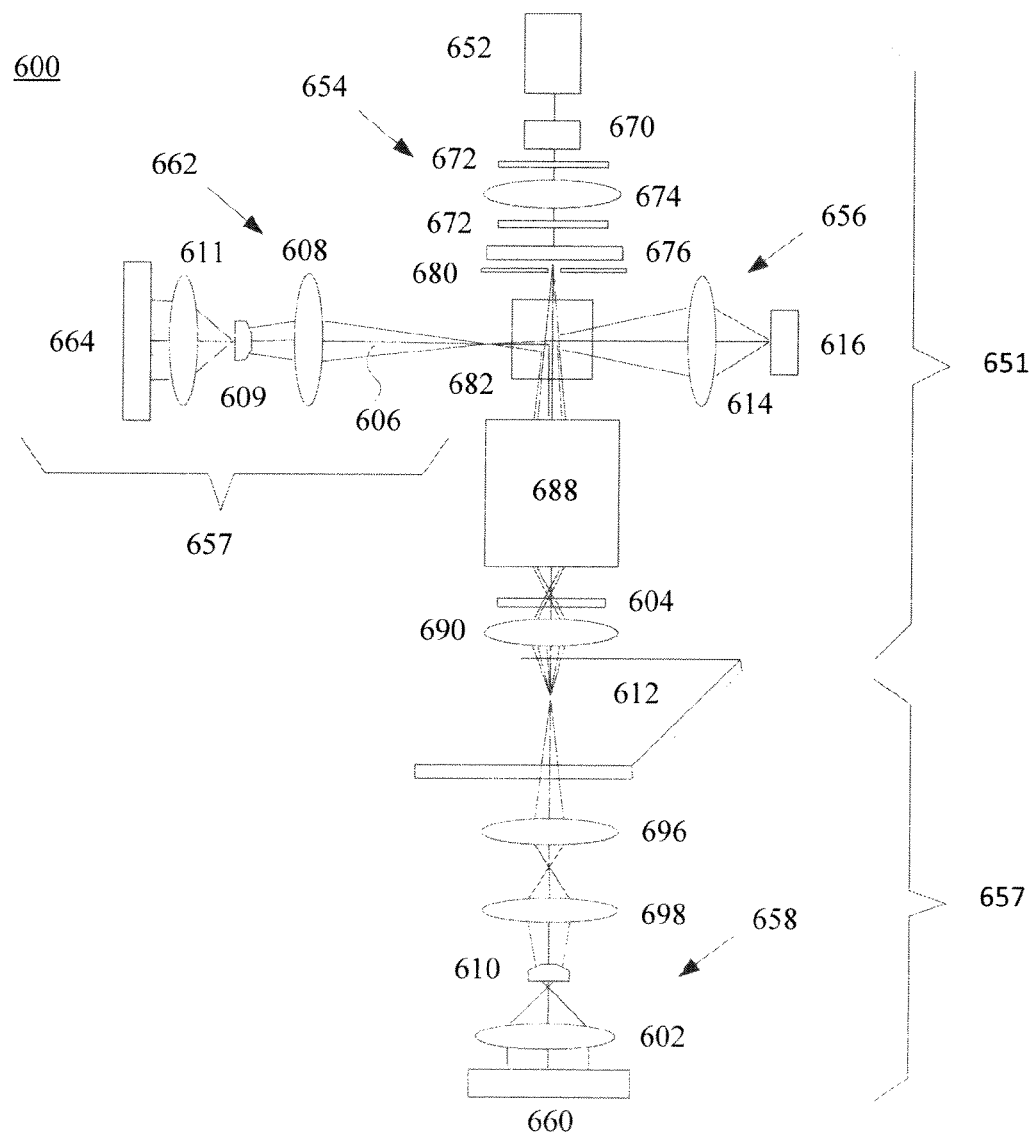
FIG. 6 illustrates an exemplary reticle or photomask inspection system configured to measure transmitted and reflected light from a substrate.

FIG. 6 illustrates an exemplary reticle or photomask inspection system 600 configured to measure transmitted and reflected light from a substrate. System 600 generally includes a first optical arrangement 651 and a second optical arrangement 657. As shown, first optical arrangement 651 includes at least a light source 652, inspection optics 654, and reference optics 656, while the second optical arrangement 657 includes at least transmitted light optics 658, transmitted light detectors 660, reflected light optics 662, and reflected light detectors 664. In one preferred configuration, light source 652 includes one of the above-described improved lasers.

Light source 652 is configured to emit a light beam that passes through an acousto-optic device 670, which is arranged for deflecting and focusing the light beam. Acousto-optic device 670 may include a pair of acousto-optic elements, e.g. an acousto-optic pre-scanner and an acousto-optic scanner, which deflect the light beam in the Y-direction and focus it in the Z-direction. By way of example, most acousto-optic devices operate by sending an RF signal to quartz or a crystal such as $TeO_2$. This RF signal causes a sound wave to travel through the crystal. Because of the travelling sound wave, the crystal becomes asymmetric, which causes the index of refraction to change throughout the crystal. This change causes incident beams to form a focused travelling spot which is deflected in an oscillatory fashion.

When the light beam emerges from acousto-optic device 670, it then passes through a pair of quarter wave plates 672 and a relay lens 674. Relay lens 674 is arranged to collimate the light beam. The collimated light beam then continues on its path until it reaches a diffraction grating 676. Diffraction grating 676 is arranged for flaring out the light beam, and more particularly for separating the light beam into three distinct beams, which are spatially distinguishable from one another (i.e. spatially distinct). In most cases, the spatially distinct beams are also arranged to be equally spaced apart and have substantially equal light intensities.

Upon leaving the diffraction grating 676, the three beams pass through an aperture 680 and then continue until they reach a beam splitter cube 682. Beam splitter cube 682 (in combination with the quarter wave plates 672) is arranged to divide the beams into two paths, i.e. one directed downward and the other directed to the right (in the configuration shown in FIG. 6). The path directed downward is used to distribute a first light portion of the beams to substrate 612, whereas the path directed to the right is used to distribute a second light portion of the beams to reference optics 656. In most embodiments, most of the light is distributed to substrate 612 and a small percentage of the light is distributed to reference optics 656, although the percentage ratios may vary according to the specific design of each optical inspection system. In one embodiment, reference optics 656 can include a reference collection lens 614 and a reference detector 616. Reference collection lens 614 is arranged to collect and direct the portion of the beams on reference detector 616, which is arranged to measure the intensity of the light. Reference optics are generally well known in the art and for the sake of brevity will not be discussed in detail.

The three beams directed downward from beam splitter 682 are received by a telescope 688, which includes several lens elements that redirect and expand the light. In one embodiment, telescope 688 is part of a telescope system that includes a plurality of telescopes rotating on a turret. For example, three telescopes may be used. The purpose of these telescopes is to vary the size of the scanning spot on the substrate and thereby allow selection of the minimum detectable defect size. More particularly, each of the telescopes generally represents a different pixel size. As such, one telescope may generate a larger spot size making the inspection faster and less sensitive (e.g., low resolution), while another telescope may generate a smaller spot size making inspection slower and more sensitive (e.g., high resolution).

From telescope 688, the three beams pass through an objective lens 690, which is arranged for focusing the beams onto the surface of a substrate 612. As the beams intersect the surface as three distinct spots, both reflected light beams and transmitted light beams may be generated. The transmitted light beams pass through substrate 612, while the reflected light beams reflect off the surface. By way of example, the reflected light beams may reflect off of opaque surfaces of the substrate, and the transmitted light beams may transmit through transparent areas of the substrate. The transmitted light beams are collected by transmitted light optics 658 and the reflected light beams are collected by reflected light optics 662.

With regards to transmitted light optics 658, the transmitted light beams, after passing through substrate 612, are collected by a first transmitted lens 696 and focused with the aid of a spherical aberration corrector lens 698 onto a transmitted prism 610. Prism 610 can be configured to have a facet for each of the transmitted light beams that are arranged for repositioning and bending the transmitted light beams. In most cases, prism 610 is used to separate the beams so that they each fall on a single detector in transmitted light detector arrangement 660 (shown as having three distinct detectors). Accordingly, when the beams leave prism 610, they pass through a second transmitted lens 602, which individually focuses each of the separated beams onto one of the three detectors, each of which is arranged for measuring the intensity of the transmitted light.

With regards to reflected light optics 662, the reflected light beams after reflecting off of substrate 612 are collected by objective lens 690, which then directs the beams towards telescope 688. Before reaching telescope 688, the beams also pass through a quarter wave plate 604. In general terms, objective lens 690 and telescope 688 manipulate the collected beams in a manner that is optically reverse in relation to how the incident beams are manipulated. That is, objective lens 690 re-collimates the beams, and telescope 688 reduces their size. When the beams leave telescope 688, they continue (backwards) until they reach beam splitter cube 682. Beam splitter 682 is configured to work with quarter wave-plate 604 to direct the beams onto a central path 606.

The beams continuing on path 606 are then collected by a first reflected lens 608, which focuses each of the beams onto a reflected prism 609, which includes a facet for each of the reflected light beams. Reflected prism 609 is arranged for repositioning and bending the reflected light beams. Similar to transmitted prism 610, reflected prism 609 is used to separate the beams so that they each fall on a single detector in the reflected light detector arrangement 664. As shown, reflected light detector arrangement 664 includes three individually distinct detectors. When the beams leave reflected prism 609, they pass through a second reflected lens 611, which individually focuses each of the separated beams onto one of these detectors, each of which is arranged for measuring the intensity of the reflected light.

There are multiple inspection modes that can be facilitated by the aforementioned optical assembly. By way of example, the optical assembly can facilitate a transmitted light inspection mode, a reflected light inspection mode, and a simultaneous inspection mode. With regards to the transmitted light inspection mode, transmission mode detection is typically used for defect detection on substrates such as conventional optical masks having transparent areas and opaque areas. As the light beams scan the mask (or substrate 612), the light penetrates the mask at transparent points and is detected by the transmitted light detectors 660, which are located behind the mask and which measure the intensity of each of the light beams collected by transmitted light optics 658 including first transmitted lens 696, second transmitted lens 602, spherical aberration lens 698, and prism 610.

With regards to the reflected light inspection mode, reflected light inspection can be performed on transparent or opaque substrates that contain image information in the form of chromium, developed photoresist or other features. Light reflected by the substrate 612 passes backwards along the same optical path as inspection optics 654, but is then diverted by a polarizing beam splitter 682 into detectors 664.

More particularly, first reflected lens 608, prism 609, and second reflected lens 611 project the light from the diverted light beams onto detectors 664. Reflected light inspection may also be used to detect contamination on top of opaque substrate surfaces.

With regards to the simultaneous inspection mode, both transmitted light and reflected light are utilized to determine the existence and/or type of a defect. The two measured values of the system are the intensity of the light beams transmitted through substrate 612 as sensed by transmitted light detectors 660 and the intensity of the reflected light beams as detected by reflected light detectors 664. Those two measured values can then be processed to determine the type of defect, if any, at a corresponding point on substrate 612.

More particularly, simultaneous transmitted and reflected detection can disclose the existence of an opaque defect sensed by the transmitted detectors while the output of the reflected detectors can be used to disclose the type of defect. As an example, either a chrome dot or a particle on a substrate may both result in a low transmitted light indication from the transmission detectors, but a reflective chrome defect may result in a high reflected light indication and a particle may result in a lower reflected light indication from the same reflected light detectors. Accordingly, by using both reflected and transmitted detection one may locate a particle on top of chrome geometry which could not be done if only the reflected or transmitted characteristics of the defect were examined. In addition, one may determine signatures for certain types of defects, such as the ratio of their reflected and transmitted light intensities. This information can then be used to automatically classify defects.

U.S. Pat. No. 7,352,457, entitled "MULTIPLE BEAM INSPECTION APPARATUS", issued on Apr. 1, 2008, and which is incorporated by reference herein, describes more details regarding system 600. For more details on reticle and photomask inspection systems that may use the inventive laser of this disclosure, see also U.S. Pat. No. 5,563,702, which is incorporated by reference herein. The reticle or photomask inspection system utilizing the improved laser of this disclosure may simultaneously detect reflected and transmitted images from the reticle or photomask on a single detector as described in U.S. Pat. No. 7,528,943, which is incorporated by reference herein.

Figure 7:
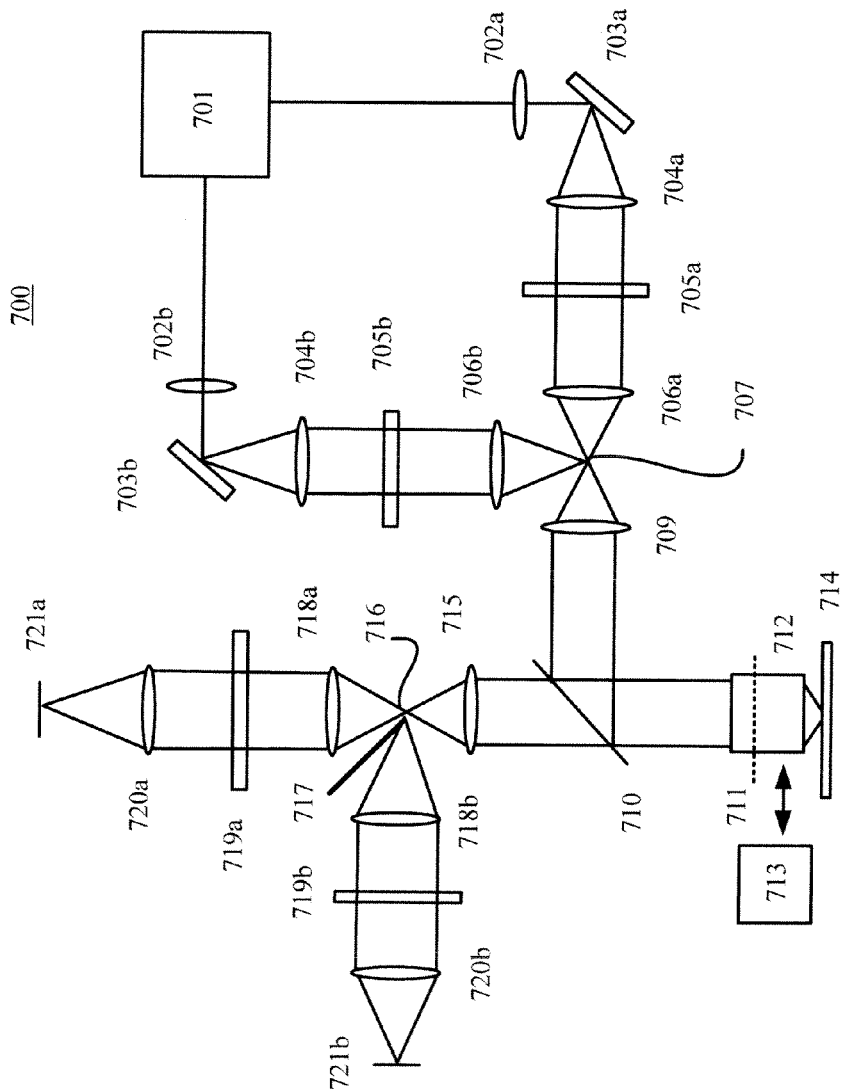
FIG. 7 illustrates an exemplary inspection system including multiple light sources having different wavelengths or wavelength ranges with different objectives optimized for different wavelength ranges.

FIG. 7 illustrates an exemplary inspection system 700 including multiple light sources having different wavelengths or wavelength ranges with different objectives optimized for different wavelength ranges. In system 700, illumination from a laser source 701 is sent to multiple sections of the illumination subsystem. A first section of the illumination subsystem includes elements 702a through 706a. Lens 702a focuses light from laser 701. Light from lens 702a then reflects from mirror 703a. Mirror 703a is placed at this location for the purposes of illustration, and may be positioned elsewhere. Light from mirror 703a is then collected by lens 704a, which forms illumination pupil plane 705a. An aperture, filter, or other device to modify the light may be placed in pupil plane 705a depending on the requirements of the inspection mode. Light from pupil plane 705a then passes through lens 706a and forms illumination field plane 707.

A second section of the illumination subsystem includes elements 702b through 706b. Lens 702b focuses light from laser 701. Light from lens 702b then reflects from mirror 703b. Light from mirror 703b is then collected by lens 704b which forms illumination pupil plane 705b. An aperture, filter, or other device to modify the light may be placed in pupil plane 705b depending on the requirements of the inspection mode. Light from pupil plane 705b then passes through lens 706b and forms illumination field plane 707. The light from the second section is then redirected by mirror or reflective surface such that the illumination field light energy at illumination field plane 707 is comprised of the combined illumination sections.

Field plane light is then collected by lens 709 before reflecting off a beamsplitter 710. Lenses 706a and 709 form an image of first illumination pupil plane 705a at objective pupil plane 711. Likewise, lenses 706b and 709 form an image of second illumination pupil plane 705b at objective pupil plane 711. An objective 712 (or alternatively 713) then takes the pupil light and forms an image of illumination field 707 at sample 714. Objective 712 or objective 713 can be positioned in proximity to sample 714. Sample 714 can move on a stage (not shown), which positions the sample in the desired location. Light reflected and scattered from the sample 714 is collected by the high NA catadioptric objective 712 or objective 713. After forming a reflected light pupil at objective pupil plane 711, light energy passes beamsplitter 710 and lens 715 before forming an internal field 716 in the imaging subsystem. This internal imaging field is an image of sample 714 and correspondingly illumination field 707. This field may be spatially separated into multiple fields corresponding to the illumination fields. Each of these fields can support a separate imaging mode.

One of these fields can be redirected using mirror 717. The redirected light then passes through lens 718b before forming another imaging pupil 719b. This imaging pupil is an image of pupil 711 and correspondingly illumination pupil 705b. An aperture, filter, or other device to modify the light may be placed in pupil plane 719b depending on the requirements of the inspection mode. Light from pupil plane 719b then passes through lens 720b and forms an image on sensor 721b. In a similar manner, light passing by mirror or reflective surface 717 is collected by lens 718a and forms imaging pupil 719a. Light from imaging pupil 719a is then collected by lens 720a before forming an image on detector 721a. Light imaged on detector 721a can be used for a different imaging mode from the light imaged on sensor 721b.

The illumination subsystem employed in system 700 is composed of laser source 701, collection optics 702-704, beam shaping components placed in proximity to a pupil plane 705, and relay optics 706 and 709. An internal field plane 707 is located between lenses 706 and 709. In one configuration, laser source 701 can include one of the above-described improved lasers.

With respect to laser source 701, while illustrated as a single uniform block having two points or angles of transmission, in reality this represents a laser source able to provide two channels of illumination, for example a first channel of light energy such as laser light energy at a first frequency which passes through elements 702a-706a, and a second channel of light energy such as laser light energy at a second frequency which passes through elements 702b-706b. Different light illumination modes may be employed, such as bright field illumination in one channel and a dark field mode in the other channel.

While light energy from laser source 701 is shown to be emitted 90 degrees apart, and the elements 702a-706a and 702b-706b are oriented at 90 degree angles, in reality light may be emitted at various orientations, not necessarily in two dimensions, and the components may be oriented differently than as shown. FIG. 7 is therefore simply a representation of the components employed and the angles or distances shown are not to scale nor specifically required for the design.

Elements placed in proximity to pupil plane 705 may be employed in the current system using the concept of aperture shaping. Using this design, uniform illumination or near uniform illumination may be realized, as well as individual point illumination, ring illumination, quadrapole illumination, or other desirable patterns.

Various implementations for the objectives may be employed in a general imaging subsystem. A single fixed objective may be used. The single objective may support all the desired imaging and inspection modes. Such a design is achievable if the imaging system supports a relatively large field size and relatively high numerical aperture. Numerical aperture can be reduced to a desired value by using internal apertures placed at the pupil planes 705a, 705b, 719a, and 719b.

Multiple objectives may also be used as shown in FIG. 7. For example, although two objectives 712 and 713 are shown, any number is possible. Each objective in such a design may be optimized for each wavelength produced by laser source 701. These objectives 712 and 713 can either have fixed positions or be moved into position in proximity to sample 714. To move multiple objectives in proximity to the sample, rotary turrets may be used as are common on standard microscopes. Other designs for moving objectives in proximity of a sample are available, including but not limited to translating the objectives laterally on a stage, and translating the objectives on an arc using a goniometer. In addition, any combination of fixed objectives and multiple objectives on a turret can be achieved in accordance with the present system.

The maximum numerical apertures of this configuration may approach or exceed 0.97, but may in certain instances be higher. The wide range of illumination and collection angles possible with this high NA catadioptric imaging system, combined with its large field size allows the system to simultaneously support multiple inspection modes. As may be appreciated from the previous paragraphs, multiple imaging modes can be implemented using a single optical system or machine in connection with the illumination device. The high NA disclosed for illumination and collection permits the implementation of imaging modes using the same optical system, thereby allowing optimization of imaging for different types of defects or samples.

The imaging subsystem also includes intermediate image forming optics 715. The purpose of the image forming optics 715 is to form an internal image 716 of sample 714. At this internal image 716, a mirror 717 can be placed to redirect light corresponding to one of the inspection modes. It is possible to redirect the light at this location because the light for the imaging modes are spatially separate. The image forming optics 718 (718a and 718b) and 720 (720a and 720b) can be implemented in several different forms including a varifocal zoom, multiple afocal tube lenses with focusing optics, or multiple image forming mag tubes. U.S. Published Application 2009/0180176, entitled "SPLIT FIELD INSPECTION SYSTEM USING SMALL CATADIOPTRIC OBJECTIVES", published on Jul. 16, 2009, and which is incorporated by reference herein, describes inspection system 700 in greater detail.

Figure 8:
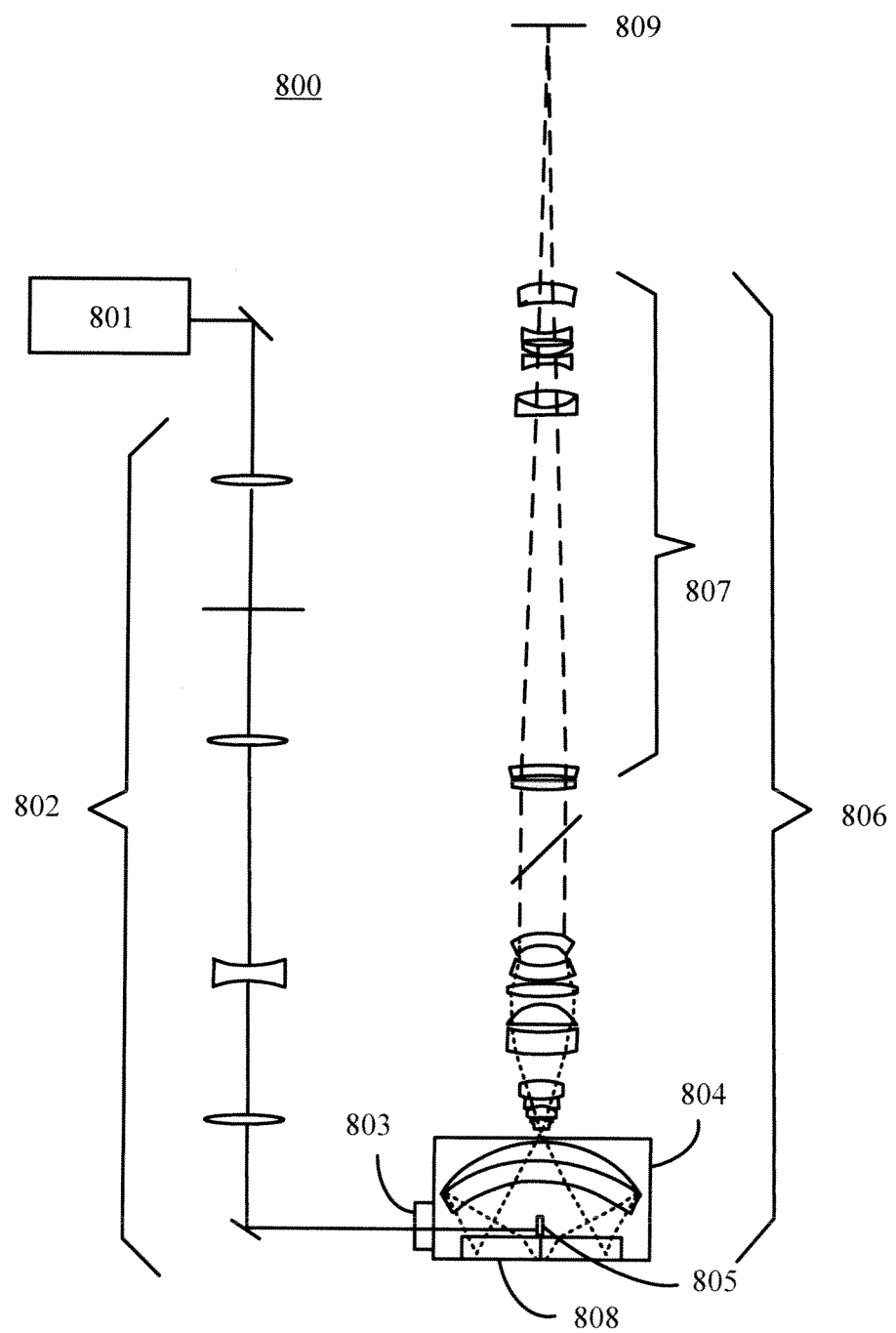
FIG. 8 illustrates an exemplary catadioptric imaging system with dark-field and bright-field inspection modes.

FIG. 8 illustrates an exemplary catadioptric imaging system 800 with dark-field and bright-field inspection modes. In system 800, the illumination block includes a laser 801, adaptation optics 802 to control the illumination beam size and profile on the surface being inspected, an aperture and window 803 in a mechanical housing 804, and a prism 805 to redirect the laser along the optical axis at normal incidence to the surface of a sample 808. Prism 805 also directs the specular reflection from surface features of sample 808 and reflections from the optical surfaces of an objective 806 along the optical path to an image plane 809. Lenses for objective 806 can be provided in the general form of a catadioptric objective, a focusing lens group, and a zooming tube lens section 807. In a preferred embodiment, laser 801 can be implemented by the one of above-described improved lasers. FIG. 8 is described in further detail in U.S. Published Application 2007/0002465, entitled "Beam delivery system for laser dark-field illumination in a catadioptric optical system", published on Jan. 4, 2007, and incorporated by reference herein.

Figure 9A:
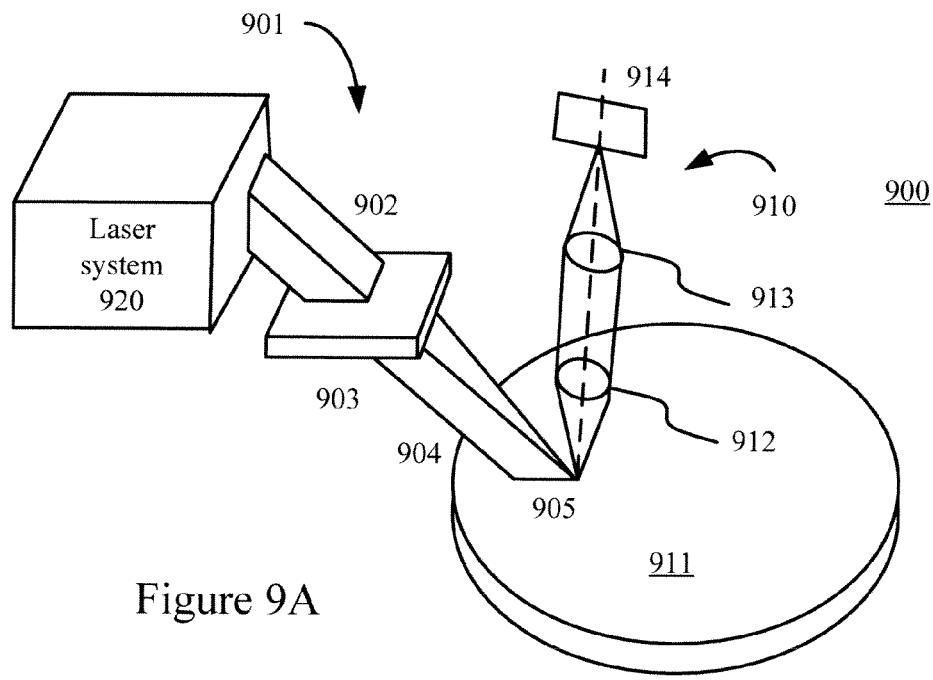
FIGS. 9A and 9B illustrate a dark-field inspection system with oblique line illumination.
Figure 9B:
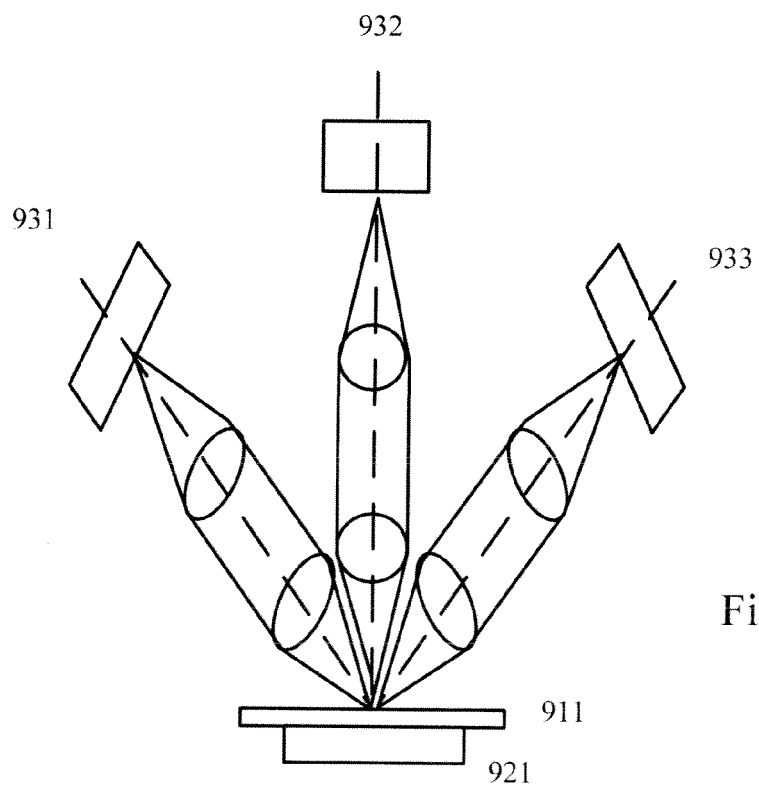

FIGS. 9A and 9B illustrate a dark-field inspection system with oblique line illumination. This inspection system may have 2 or 3 different collection systems including off axis and near normal collection as shown. This dark field inspection system may also include normal incidence line illumination (not shown). More details including an explanation of the system shown in FIGS. 9A and 9B are described in further detail in in U.S. Pat. No. 7,525,649, entitled "Surface inspection system using laser line illumination with two dimensional imaging", issued on Apr. 28, 2009, and incorporated by reference herein.

FIG. 9A illustrates a surface inspection apparatus 900 that includes illumination system 901 and collection system 910 for inspecting areas of surface 911. As shown in FIG. 9A, a laser system 920 directs a light beam 902 through beam shaping optics 903. In a preferred embodiment, the laser system 920 includes one of the above described lasers. First beam shaping optics 903 can be configured to receive a beam from the laser system, which is focused onto surface 911.

Beam shaping optics 903 is oriented so that its principal plane is substantially parallel to a sample surface 911 and, as a result, illumination line 905 is formed on surface 911 in the focal plane of beam shaping optics 903. In addition, light beam 902 and focused beam 904 are directed at a non-orthogonal angle of incidence to surface 911. In particular, light beam 902 and focused beam 904 may be directed at an angle between about 1° and about 85° from a normal direction to surface 911. In this manner, illumination line 905 is substantially in the plane of incidence of focused beam 904.

Collection system 910 includes lens 912 for collecting light scattered from illumination line 905 and lens 913 for focusing the light coming out of lens 912 onto a device, such as charge coupled device (CCD) 914, comprising an array of light sensitive detectors. In one embodiment, CCD 914 may include a linear array of detectors. In such cases, the linear array of detectors within CCD 914 can be oriented parallel to illumination line 905. In one embodiment, multiple collection systems can be included, wherein each of the collection systems includes similar components, but differ in orientation.

For example, FIG. 9B illustrates an exemplary array of collection systems 931, 932, and 933 for a surface inspection apparatus (wherein its illumination system, e.g. similar to that of illumination system 901, is not shown for simplicity). First optics in collection system 931 collect light scattered in a first direction from the surface of sample 911. Second optics in collection system 932 collect light scattered in a second direction from the surface of sample 911. Third optics in collection system 933 collect light scattered in a third direction from the surface of sample 911. Note that the first, second, and third paths are at different angles of reflection to said surface of sample 911. A platform 921 supporting sample 911 can be used to cause relative motion between the optics and sample 911 so that the whole surface of sample 911 can be scanned.

Figure 10:
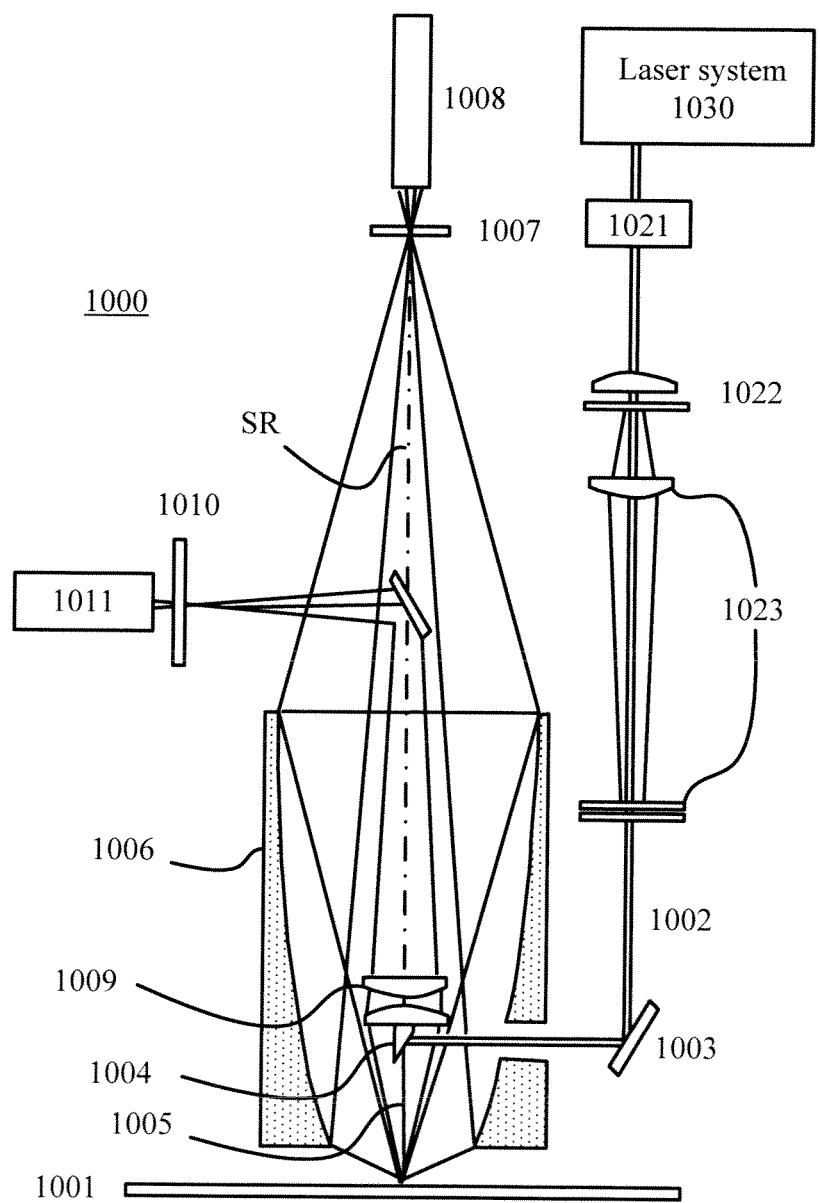
FIG. 10 illustrates a surface inspection system that can be used for inspecting anomalies on a surface.
Figure 11:
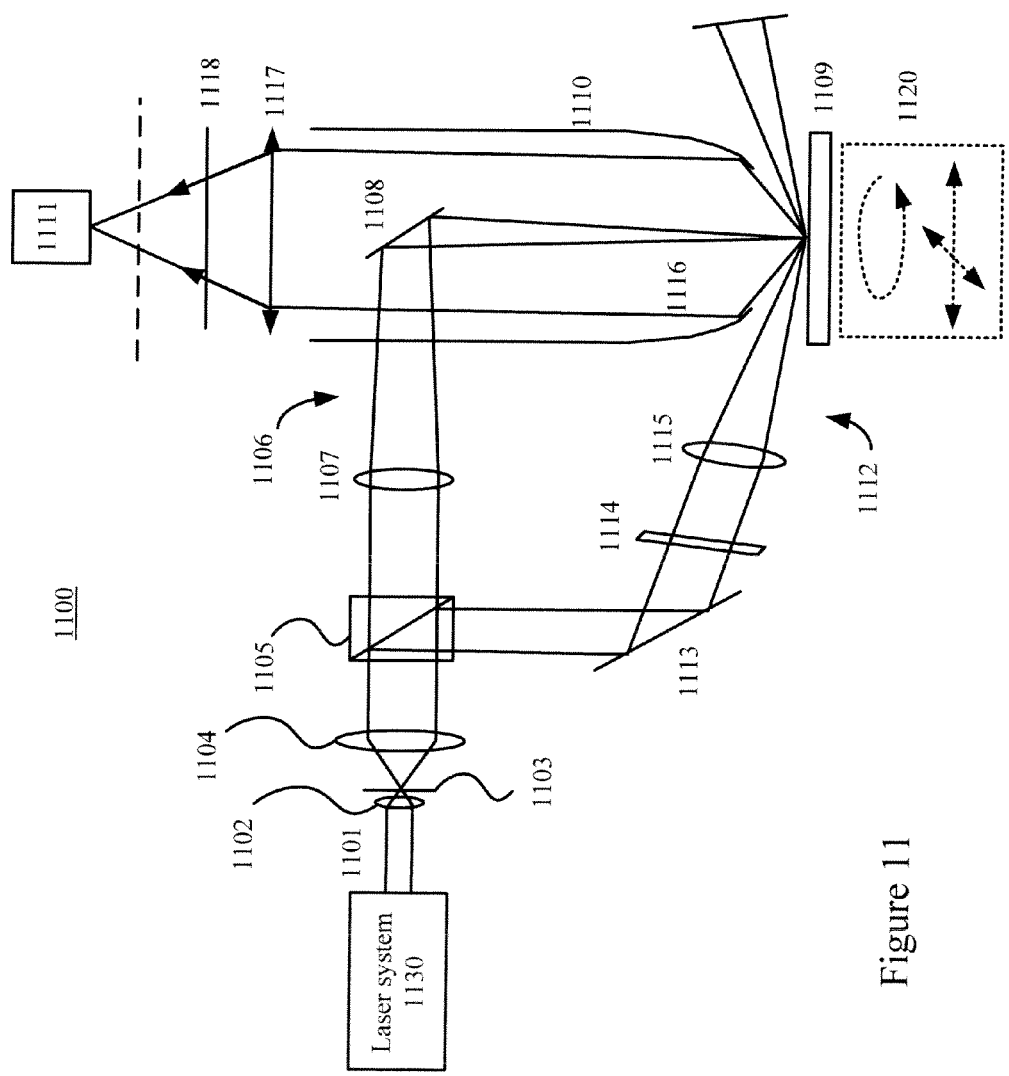
FIG. 11 illustrates an inspection system configured to implement anomaly detection using both normal and oblique illumination beams.

This laser may also be used in inspection systems for unpatterned wafers such as those shown in FIGS. 10 and 11. Such an inspection system may incorporate oblique and/or normal incidence illumination and a large collection solid angle for the scattered light as shown in these figures.

FIG. 10 illustrates a surface inspection system 1000 that can be used for inspecting anomalies on a surface 1001. In this embodiment, surface 1001 can be illuminated by a substantially stationary illumination device portion of a laser system 1030 comprising a laser beam generated by one of the above-described improved lasers. The output of laser system 1030 can be consecutively passed through polarizing optics 1021, a beam expander and aperture 1022, and beam-forming optics 1023 to expand and focus the beam.

The resulting focused laser beam 1002 is then reflected by a beam folding component 1003 and a beam deflector 1004 to direct the beam 1005 towards surface 1001 for illuminating the surface. In the preferred embodiment, beam 1005 is substantially normal or perpendicular to surface 1001, although in other embodiments beam 1005 may be at an oblique angle to surface 1001.

In one embodiment, beam 1005 is substantially perpendicular or normal to surface 1001 and beam deflector 1004 reflects the specular reflection of the beam from surface 1001 towards beam turning component 1003, thereby acting as a shield to prevent the specular reflection from reaching the detectors. The direction of the specular reflection is along line SR, which is normal to the surface 1001 of the sample. In one embodiment where beam 1005 is normal to surface 1001, this line SR coincides with the direction of illuminating beam 1005, where this common reference line or direction is referred to herein as the axis of inspection system 1000. Where beam 1005 is at an oblique angle to surface 1001, the direction of specular reflection SR would not coincide with the incoming direction of beam 1005; in such instance, the line SR indicating the direction of the surface normal is referred to as the principal axis of the collection portion of inspection system 1000.

Light scattered by small particles is collected by mirror 1006 and directed towards aperture 1007 and detector 1008. Light scattered by large particles is collected by lenses 1009 and directed towards aperture 1010 and detector 1011. Note that some large particles will scatter light that is also collected and directed to detector 1008, and similarly some small particles will scatter light that is also collected and directed to detector 1011, but such light is of relatively low intensity compared to the intensity of scattered light that the respective detector is designed to detect. In one embodiment, detector 1011 can include an array of light sensitive elements, wherein each light sensitive element of the array of light sensitive elements is configured to detect a corresponding portion of a magnified image of the illumination line. In one embodiment, inspection system can be configured for use in detecting defects on unpatterned wafers. FIG. 10 is described in further detail in U.S. Pat. No. 6,271,916, entitled "Process and assembly for non-destructive surface inspection", issued on Aug. 7, 2001, and incorporated by reference herein.

FIG. 11 illustrates an inspection system 1100 configured to implement anomaly detection using both normal and oblique illumination beams. In this configuration, a laser system 1130, which includes one of the above-described improved lasers, can provide a laser beam 1101. A lens 1102 focuses the beam 1101 through a spatial filter 1103 and lens 1104 collimates the beam and conveys it to a polarizing beam splitter 1105. Beam splitter 1105 passes a first polarized component to the normal illumination channel and a second polarized component to the oblique illumination channel, where the first and second components are orthogonal. In the normal illumination channel 1106, the first polarized component is focused by optics 1107 and reflected by mirror 1108 towards a surface of a sample 1109. The radiation scattered by sample 1109 is collected and focused by a paraboloidal mirror 1110 to a photomultiplier tube or detector 1111.

In the oblique illumination channel 1112, the second polarized component is reflected by beam splitter 1105 to a mirror 1113 which reflects such beam through a half-wave plate 1114 and focused by optics 1115 to sample 1109. Radiation originating from the oblique illumination beam in the oblique channel 1112 and scattered by sample 1109 is also collected by paraboloidal mirror 1110 and focused to detector 1111. In some embodiments, detector 1111 comprises one of a photomultiplier tube, an avalanche detector, a linear array detector, an electron-bombarded linear array detector and an image-intensified linear array detector. Note that detector 1111 has an aperture at its entrance. The aperture and the illuminated spot or line (from the normal and oblique illumination channels on surface 1109) are preferably at the foci of the paraboloidal mirror 1110.

The paraboloidal mirror 1110 collimates the scattered radiation from sample 1109 into a collimated beam 1116. Collimated beam 1116 is then focused by an objective 1117 and through an analyzer 1118 to the detector 1111. Note that curved mirrored surfaces having shapes other than paraboloidal shapes may also be used. An instrument 1120 can provide relative motion between the beams and sample 1109 so that the beams are scanned across the surface of sample 1109. Inspection systems similar to that shown in FIG. 11 are described in further detail in U.S. Pat. No. 6,201,601, entitled "Sample inspection system", issued on Mar. 13, 2001, and incorporated by reference herein.

The various embodiments of the structures and methods of this invention that are described above are illustrative only of the principles of this invention and are not intended to limit the scope of the invention to the particular embodiments described. For example, the fundamental laser need not be limited to the specific laser types listed above. In addition to the above fundamental laser types, the fundamental laser may include a diode laser, a fiber laser, a neodymium-doped yttrium lithium fluoride laser, or any kind of laser generating a fundamental frequency corresponding to a wavelength between about 1 µm and about 1.1 µm. Other types of NLO crystals than those listed above may be substituted in one or more of the harmonic generator modules. Some of the harmonic generator modules described above include a resonant cavity. Any type of optical resonant cavity known in the art may be used including those comprising two, three or four mirrors or prisms. Any of the lenses, prisms, beam splitters or other optical components may comprise Brewster-angle optics such as those described in U.S. Pat. No. 8,711,460 entitled "High damage threshold frequency conversion system" issued to Armstrong on Apr. 29, 2014, which is incorporated by reference herein. Thus, the invention is limited only by the following claims and their equivalents.

The invention claimed is:

1. A deep ultra-violet (DUV) continuous wave (CW) laser comprising:
a fundamental CW laser configured to generate a fundamental frequency with a corresponding wavelength between about 1 μm and 1.1 μm;
a third harmonic generator module including at least one periodically poled first non-linear optical (NLO) crystal, said third harmonic generator module positioned to receive a first portion of the fundamental frequency and configured to generate a third harmonic; and
a fourth harmonic generator module comprising:
a plurality of mirrors configured to form a cavity resonant at the corresponding wavelength of the fundamental frequency;
a coupler configured to couple a second portion of the fundamental frequency in the cavity such that the second portion is directed along a cavity light path defined by the plurality of mirrors;
a second NLO crystal disposed in the cavity light path;
one or more lenses configured to focus the third harmonic inside the second NLO crystal such that the third harmonic overlaps the second fundamental portion inside the second NLO crystal, wherein the second NLO crystal is configured to combine said second portion of the fundamental frequency with the third harmonic to generate a fourth harmonic; and
a beam splitter configured to reflect an unconsumed portion of the third harmonic leaving the second NLO crystal away from said cavity light path such that said unconsumed third harmonic portion does not recirculate in the cavity.

2. The laser of claim 1, wherein the third harmonic generator module does not use a resonant cavity.

3. The laser of claim 1, wherein the third harmonic generator module further comprises a cavity that is resonant at the fundamental frequency.

4. The laser of claim 1, wherein the at least one periodically poled first NLO crystal generates a second harmonic.

5. The laser of claim 1, wherein the at least one periodically poled first NLO crystal generates the third harmonic.

6. The laser of claim 1, wherein the at least one periodically poled first NLO crystal comprises a dual-period poled crystal for direct generation of the third harmonic.

7. The laser of claim 1, wherein the third harmonic generator module comprises two periodically poled NLO crystals.

8. The laser of claim 1, wherein the at least one periodically poled first NLO crystal is controlled in temperature to maximize third harmonic generation efficiency.

9. The laser of claim 1, wherein the fundamental frequency is focused to an elliptical beam with a short axis substantially parallel to a poling depth of the at least one periodically poled first NLO crystal.

10. The laser of claim 1, wherein the third harmonic generator module uses a periodically poled first NLO crystal with a domain period longer than 2 μm to achieve third-order quasi-phase matching for sum frequency generation of the third harmonic.

11. The laser of claim 1, wherein electric-optic modulation is used to enhance third harmonic conversion efficiency.

12. A method of generating deep ultra-violet (DUV) continuous wave (CW) laser radiation comprising:
generating a fundamental frequency with a corresponding wavelength between about 1 μm and 1.1 μm;
converting a first portion of the fundamental frequency to a second harmonic using a periodically poled first NLO crystal;
combining another portion of the fundamental frequency with the second harmonic to generate a third harmonic;
generating a fourth harmonic by combining a second portion of the fundamental frequency with the third harmonic in a cavity resonant at the corresponding wavelength of the fundamental frequency, wherein said generating the fourth harmonic comprises focusing the third harmonic inside a second NLO crystal operably disposed in the cavity and configured to perform sum frequency generation of said second portion of the fundamental frequency and said third harmonic; and
reflecting an unconsumed portion of the third harmonic leaving the second NLO crystal such that said unconsumed third harmonic portion does not recirculate in the cavity.

13. The method of claim 12, wherein the periodically poled first NLO crystal for second harmonic generation is not placed in any resonant cavity.

14. The method of claim 12, wherein the first NLO crystal for second harmonic generation and another periodically poled NLO crystal for third harmonic generation are contained in another cavity resonant at the fundamental frequency.

15. The method of claim 12, wherein the second harmonic and the third harmonic are generated using a dual-period poled crystal.

16. The method of claim 12, wherein the second harmonic and the third harmonic are generated using two periodically poled NLO crystals.

17. The method of claim 12, wherein the periodically poled first NLO crystal for second harmonic generation includes at least one of $LiNbO_3$, SLT, $LiTaO_3$, KTP, KTA, $MgO:LiNbO_3$, and MgO:SLT.

18. The method of claim 12, wherein the periodically poled first NLO crystal is controlled in temperature to maximize third harmonic generation efficiency.

19. The method of claim 12, wherein the fundamental frequency is focused to an elliptical beam with a short axis substantially parallel to a poling depth of the periodically poled first NLO crystal.

20. The method of claim 12, wherein the generation of the third harmonic uses a periodically poled crystal with a domain period longer than 2 μm to achieve third-order quasi-phase matching.

21. The method of claim 12, wherein electric-optic modulation is used to enhance the third harmonic conversion efficiency.

22. The method of claim 12, wherein said generating the fourth harmonic further comprises focusing the third harmonic inside a single bulk crystal comprising hydrogen-annealed CLBO, CBO, LBO, LB4 or BBO.

* * * * *